US008053120B2

(12) United States Patent
Yagi et al.

(10) Patent No.: US 8,053,120 B2
(45) Date of Patent: Nov. 8, 2011

(54) FUEL CELL SYSTEM AND CONTROL METHOD THEREOF

(75) Inventors: Ryosuke Yagi, Tokyo (JP); Takahiro Suzuki, Tokyo (JP); Yuusuke Sato, Tokyo (JP); Eiichi Sakaue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1083 days.

(21) Appl. No.: 11/531,582

(22) Filed: Sep. 13, 2006

(65) Prior Publication Data

US 2010/0255395 A1 Oct. 7, 2010

(30) Foreign Application Priority Data

Dec. 14, 2005 (JP) ................................. 2005-360700

(51) Int. Cl.
 *H01M 8/04* (2006.01)
(52) U.S. Cl. ........ 429/428; 429/427; 429/443; 429/447; 429/448
(58) Field of Classification Search .................. 429/443, 429/433
See application file for complete search history.

(56) References Cited

U.S. PATENT DOCUMENTS

| 2002/0119352 A1* | 8/2002 | Baldauf et al. ............. 429/13 |
| 2004/0185314 A1* | 9/2004 | Miyamoto et al. ............. 429/22 |
| 2005/0040786 A1* | 2/2005 | Ichinose et al. ............. 320/101 |
| 2005/0079398 A1 | 4/2005 | Tomioka et al. |
| 2007/0087234 A1 | 4/2007 | Wang |
| 2008/0233444 A1 | 9/2008 | Yagi et al. |
| 2009/0092867 A1 | 4/2009 | Suzuki et al. |

FOREIGN PATENT DOCUMENTS

| JP | 05-258760 | * | 3/1992 |
| JP | 5-258760 | | 10/1993 |
| JP | 2005-11633 | | 1/2005 |
| JP | 2005-011633 | * | 1/2005 |
| JP | 2005-32610 | | 2/2005 |
| JP | 2005-93143 | | 4/2005 |
| JP | 2005-108718 | | 4/2005 |
| JP | 2005-259647 | | 9/2005 |
| JP | 2005-322631 | | 11/2005 |

OTHER PUBLICATIONS

U.S. Appl. No. 12/411,939, filed Mar. 26, 2009, Yagi et al.
Japanes Office Action mailed Oct. 5, 2010 (4 pgs) with English translation of 5 pgs.

* cited by examiner

*Primary Examiner* — Ula C Ruddock
*Assistant Examiner* — Jacob Marks
(74) *Attorney, Agent, or Firm* — Oblon, Spivak, McClelland, Maier & Neustadt, L.L.P.

(57) ABSTRACT

There are provided a power generation unit, a fuel tank, a line, a mixing tank, a fuel circulation unit which circulates a mixture fuel from the mixing tank to the mixing tank via the power generation unit and the line, a fuel supplier which supplies the fuel from the fuel tank to the mixing tank, an air supplier which supplies air to a cathode, a power adjustment unit which adjusts the current applied to the load in accordance with a generated power output, a fan which adjusts the temperature of the power generator, and a control unit which detects the concentration and volume of the mixture fuel and manipulates, on the basis of a detection result, the fuel circulation unit, the fuel supplier, the load of the power adjustment unit, the air supplier and the fan to control the concentration and volume of the mixture fuel.

9 Claims, 11 Drawing Sheets

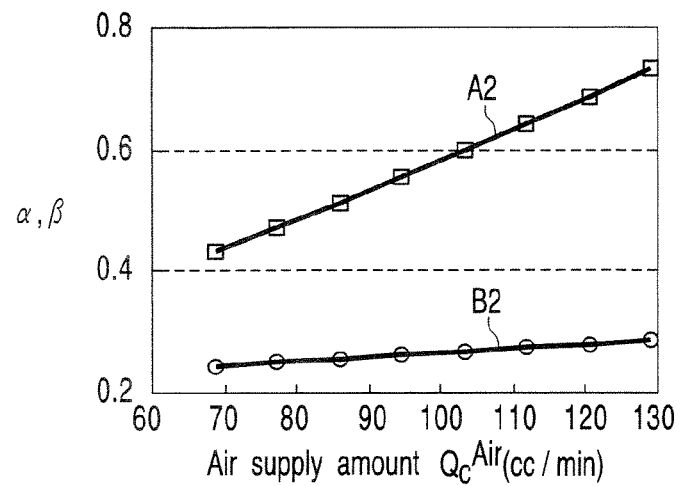
F I G. 3
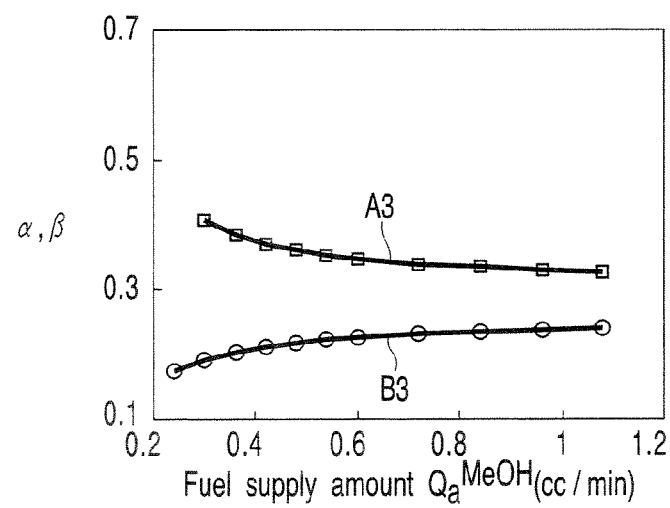
F I G. 4
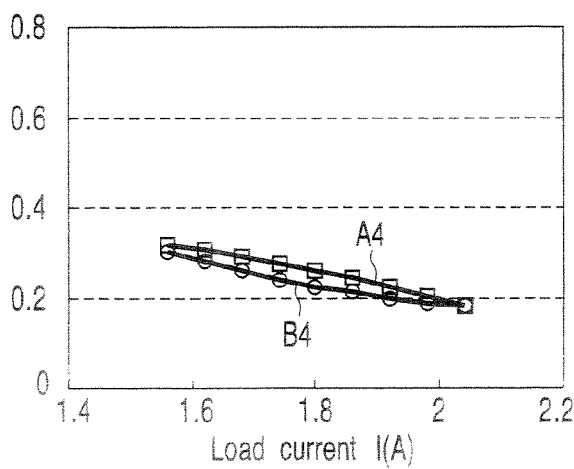
F I G. 5

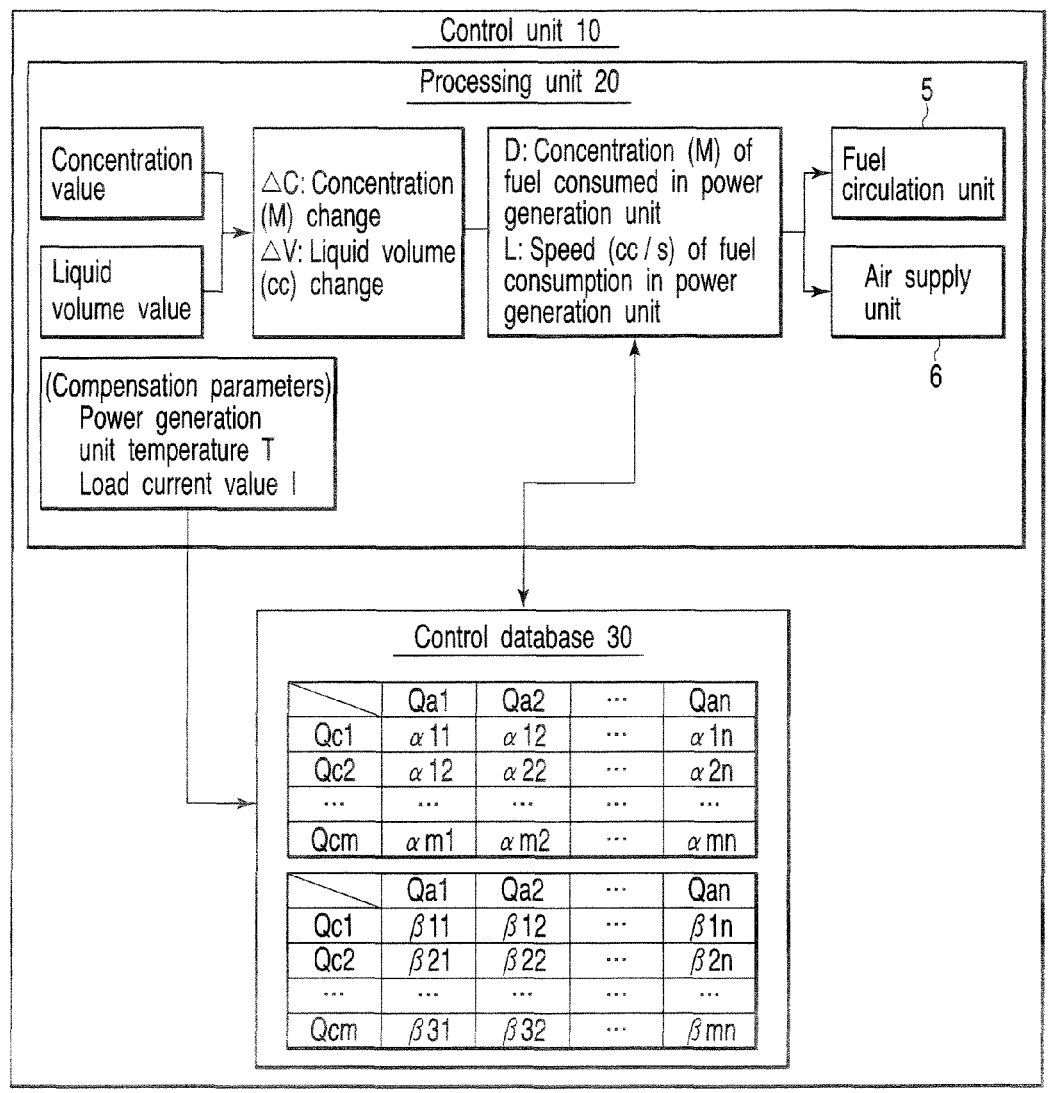
F I G. 13

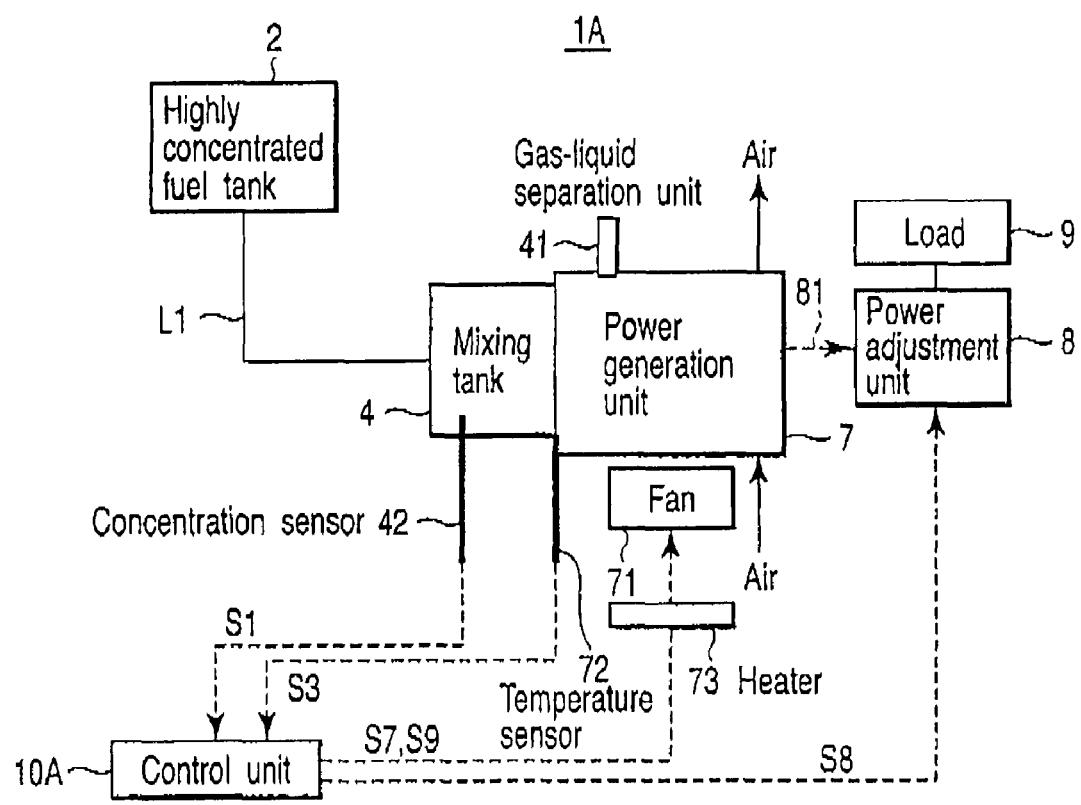
F I G. 1 6

FUEL CELL SYSTEM AND CONTROL METHOD THEREOF

CROSS-REFERENCE TO RELATED APPLICATIONS

This application is based upon and claims the benefit of priority from prior Japanese Patent Application No. 2005-360700, filed Dec. 14, 2005, the entire contents of which are incorporated herein by reference.

BACKGROUND OF THE INVENTION

1. Field of the Invention

The present invention relates to a small-sized fuel cell system for use in a portable device and a control method thereof.

2. Description of the Related Art

Direct methanol fuel cells (DMFCs) have been under development as small power sources for portable devices for the following reasons: auxiliary equipment such as a vaporizer and a humidifier is not required; methanol is easier to handle than gas fuels such as hydrogen; and operation at low temperature is possible.

The DMFC comprises a membrane-electrode assembly (MEA), an anode and a cathode, and for the DMFCs, there are an active type using the auxiliary equipment for fuel supply to the anode and the cathode, and a passive type utilizing natural force. In the former active DMFC, the output density of a cell can be increased, but auxiliary equipment is essential, such as a pump for fuel supply to the anode and cathode.

Furthermore, in the DMFC, water of the same mol as that of methanol is required for an anode reaction. Moreover, when highly concentrated methanol is directly supplied to the MEA, methanol crossover is increased, and the efficiency of fuel use thus decreases. Therefore, a water collection mechanism can be provided as auxiliary equipment on the cathode side in order to efficiently collect water produced in a cathode reaction and mix the collected water with the highly concentrated methanol fuel in a mixing tank. It is to be noted that another possibility is a system in which the fuel is only circulated on the anode side without collecting water on the cathode side in order to prevent an increase in the volume of an apparatus due to the installation of the water collection mechanism on the cathode side.

In such a circulation-type fuel cell system, it is important to maintain a proper concentration of the fuel supplied to the anode and to maintain a proper volume of liquid in the mixing tank for sending the fuel to the anode. Various proposals have heretofore been made for systems to control the concentration and volume of the fuel. For example, JPA 2005-32610(KOKAI) incorporated by reference proposes a system in which the flow volume of a fuel from a highly concentrated fuel tank and a cathode water collection unit are manipulated to control the concentration of a mixture. Further, JPA 2005-11633 (KOKAI) incorporated by reference proposes a system in which the amount of a fuel supplied from a highly concentrated fuel tank and a cathode side water collection amount are manipulated to control the concentration of a mixture. Still further, JPA 5-258760 (KOKAI) incorporated by reference proposes a system in which the amount of a fuel supplied from a highly concentrated fuel tank and the amount of water supplied from a water tank are manipulated to control the volume and concentration of a mixture. Further yet, JPA 2005-108713 (KOKAI) incorporated by reference proposes a system in which air discharged from a cathode is sent into a condensation unit, and a condensation fan and a water collection unit are manipulated to change the amount of water supplied to a mixing tank, thereby controlling the volume and concentration of a mixture.

However, to control the concentration and volume of the fuel in the mixing tank, each of these conventional fuel cell systems comprises a cathode side water collection unit, an anode side fuel supply unit, a water collection/circulation path connecting the cathode side with the anode side, and a water tank to supply water from the outside. The volume occupied by the auxiliary equipment including the water collection unit, the water collection/circulation path and the water tank is large, which increases the size of the entire apparatus. Thus, the conventional fuel cell systems are too large to be used as power sources for portable small devices such as mobile telephones, portable audio terminals and notebook computers.

On the other hand, if the water tank, the water collection/circulation path, etc. are eliminated from the fuel cell system to reduce the size of the system, the efficiency of fuel use decreases.

BRIEF SUMMARY OF THE INVENTION

According to an aspect of the present invention, a fuel cell system comprises: a power generation unit including an anode, a cathode and an electrolytic film provided between the anode and the cathode; a fuel tank which stores a raw fuel or a highly concentrated fuel; an anode collection path which communicates with the and which collects an emission from the anode; a mixing tank which communicates with the power generation unit via the anode collection path and also communicates with the fuel tank and which mixes the emission with the raw fuel or the highly concentrated fuel to produce a mixture fuel; a fuel circulation unit which is provided between the mixing tank and the power generation unit and which supplies the mixture fuel from the mixing tank to the anode of the power generation unit and which circulates the emission to the mixing tank through the anode collection path; a fuel supply unit which supplies the raw fuel or the highly concentrated fuel from the fuel tank to the mixing tank; an air supply unit which supplies air to the cathode of the power generation unit; a power adjustment unit which adjusts the current applied to the load; temperature adjustment means for adjusting the temperature of the power generation unit; detection means for detecting at least one of the concentration of the mixture fuel and the volume of liquid in the mixing tank; and a control unit which controls at least one of the fuel circulation unit, the fuel supply unit, the power adjustment unit, the air supply unit and the temperature adjustment means on the basis of a detection result of the detection means.

According to another aspect of the present invention, a fuel cell system comprises: a power generation unit including an anode, a cathode and an electrolytic film provided between the anode and the cathode; a fuel tank which stores a raw fuel or a highly concentrated fuel; a mixing tank in which a mixture fuel therein is provided to be in contact with the anode and which communicates with the fuel tank and which mixes an emission from the anode with the raw fuel or the highly concentrated fuel to produce the mixture fuel; a power adjustment unit which adjusts the current applied to the load; temperature adjustment means for adjusting the temperature of the power generation unit; detection means for detecting the concentration of the mixture fuel; and a control unit which controls the power adjustment unit and the temperature adjustment means on the basis of a detection result of the detection means.

According to another aspect of the present invention, a method of controlling a fuel cell system equips with a power generation unit, a fuel tank, an anode collection path, a mixing tank, a fuel circulation unit, a fuel supply unit, an air supply unit, a power adjustment unit, temperature adjustment means, detection means and a control unit, the method comprises:

(i) detecting by the detection means at least one of the concentration and volume of the mixture fuel supplied to an anode of the power generation unit during power generation; and (ii) controlling by the control unit at least one of the fuel circulation unit, the fuel supply unit, the power adjustment unit, the air supply unit and the temperature adjustment means on the basis of the detection result, and controlling at least one of the concentration and volume of the mixture fuel.

According to another aspect of the present invention, a method of controlling a fuel cell system equips with a power generation unit, a fuel tank, an anode collection path, a mixing tank, a fuel circulation unit, a fuel supply unit, an air supply unit, a power adjustment unit, temperature adjustment means, detection means and a control unit further comprises:

(a) detecting by the detection means at least one of the concentration of the mixture fuel and the temperature of the power generation unit during power generation; and (b) controlling by the control unit at least one of the power adjustment unit and the temperature adjustment means on the basis of the detection result, and controlling the concentration of the mixture fuel.

BRIEF DESCRIPTION OF THE SEVERAL VIEWS OF THE DRAWING

FIG. 3 is a graph showing the relationship between an air supply amount $Qc^{Air}$ and the parameters α, β;

FIG. 4 is a graph showing the relationship between a fuel supply amount $Qa^{MeOH}$ and the parameters α, β;

FIG. 5 is a graph showing the relationship between a load current I and the parameters α, β;

FIG. 13 is a control block diagram of the fuel cell system shown in FIG. 1;

FIG. 16 is a configuration block diagram showing a fuel cell system according to another embodiment of the present invention.

DETAILED DESCRIPTION OF THE INVENTION

A best mode for carrying out the present invention will hereinafter be described with reference to the accompanying drawings.

First Embodiment

Figure 1:
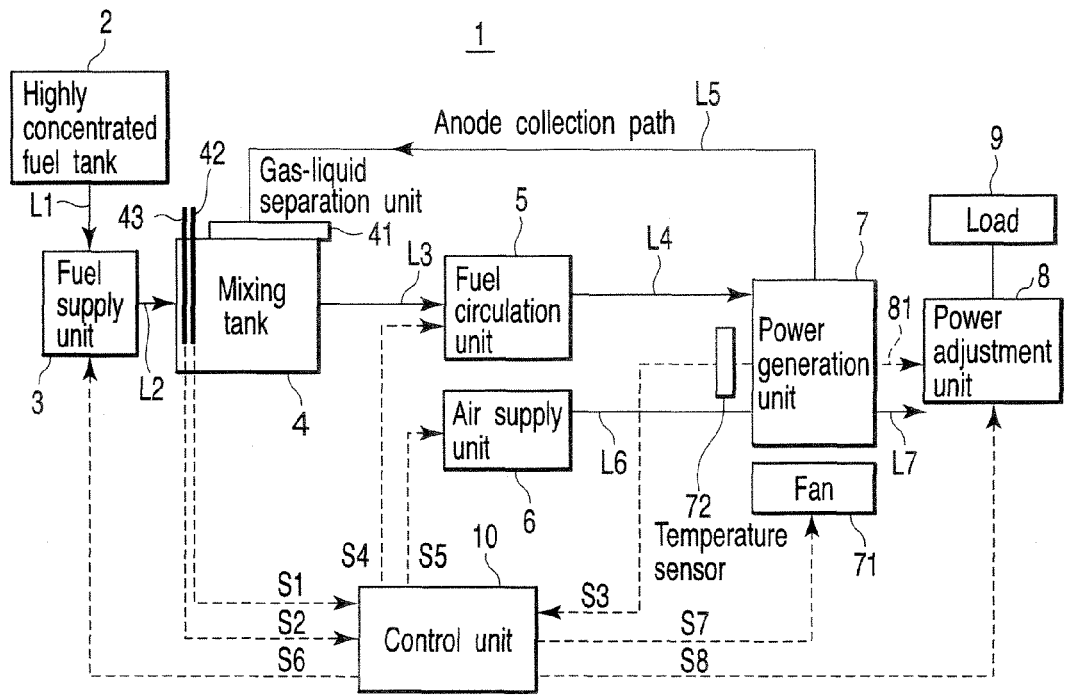
FIG. 1 is a configuration block diagram showing a fuel cell system according to an embodiment of the present invention.

As shown in FIG. 1, a fuel cell system 1 according to a first embodiment of the present invention comprises a power generation unit 7 and auxiliary equipment necessary for the power generation unit to generate power. The system 1 has, as the main auxiliary equipment, a highly concentrated fuel tank 2, a fuel supply unit 3, a mixing tank 4, a fuel circulation unit 5, an air supply unit 6, a power adjustment unit 8 and a control unit 10, and has, as secondary auxiliary equipment, a concentration sensor 42, a liquid volume sensor 43, a fan 71 and a temperature sensor 72.

The above auxiliary equipment is directly or indirectly connected to the power generation unit 7 by a plurality of lines L1 to L7, and a fluid (a liquid, a gas or a gas-liquid mixture) is supplied to the power generation unit 7 through the lines L1 to L7 by use of natural force or mechanical force or both of them and discharged from the power generation unit 7. The method mainly using the natural force (e.g., capillary force) to carry the fluid is called "passive fuel cell system", while the method mainly using the mechanical force (e.g., pumping power) to carry the fluid is called "active fuel cell system".

The overall fuel cell system 1 is totally controlled by the control unit 10. The control unit 10 is connected to the power generation unit 7 and the auxiliary equipment by signal lines, and various signals S1 to S8 are transmitted/received among the control unit 10, the power generation unit 7 and the auxiliary equipment. For example, the concentration sensor 42 detects the concentration of a mixture fuel (e.g., a methanol solution) in the mixing tank 4, and sends a detection signal S1 thereof to the control unit 10. The liquid volume sensor 43 detects the volume of the mixture fuel in the mixing tank 4, and sends a detection signal S2 thereof to the control unit 10. Moreover, the temperature sensor 72 detects the temperature of the power generation unit 7, and sends a detection signal S3 thereof to the control unit 10.

As shown in FIG. 13, the control unit 10 obtains various controlled variables on the basis of the detection signals S1, S2 and S3 and of process data in a database 30, and obtains various manipulated variables on the basis of the obtained controlled variables and various parameter values of a processing unit 20, thus outputting manipulation command signals S4 to S8 to any one or two or more of the fuel circulation unit 5, the fuel supply unit 3, the air supply unit 6, the power adjustment unit 8, and the fan 71 of the power generation unit 7. For example, if the manipulation signal S8 is output from the control unit 10 to the power adjustment unit 8, a load current I applied to a load 9 is adjusted to a desired value. It is to be noted that the process data in the database 30 has been previously obtained by a demonstration experiment, and, for example, represents correlation data on parameters α, β and various manipulated variable values. Further, the processing unit 20 outputs the manipulation command signals S4 to S8 on the basis of information input from the concentration sensor 42, the liquid volume sensor 43, the temperature sensor 72 and the like and on the basis of the process data in the database 30, and, for example, outputs the manipulation command signals on the basis of data such as concentration control parameters and liquid volume control parameters and of equations.

The power generation unit 7 has therein a stack of an anode/a catalyst layer/an electrolytic film catalyst layer/a cathode (membrane-electrode assembly [MEA]), an anode flow path plate and a cathode flow path plate. The power generation unit 7 converts chemical energy of the fuel into electric energy to generate power. The MEA is configured as follows: catalyst particles are applied to both surfaces of the electrolytic film made from a proton-conductive solid polymer membrane in such a manner as to sandwich the electrolytic film, on which methanol and air are supplied to the catalyst layer, and at the same time, carbon dioxide and water produced in a reaction are discharged from the catalyst layer, and then a gas diffusion layer is mounted to smoothly collect electrons which have reacted. An entrance of the anode flow path plate is connected to the line L4, and an exit thereof is connected to the line L5. An entrance of the cathode flow path plate is connected to the line L6, and an exit thereof is connected to the line L7 which discharges by-product carbon dioxide to the outside of the system.

Furthermore, the power generation unit 7 has the fan 71 and the temperature sensor 72. The fan 71 is used as temperature adjustment means for blowing air to the power generation unit 7 to cool off the power generation unit 7. It is to be noted that for the temperature adjustment means, a peltier element, a water-cooling jacket or the like can be used instead of the fan 71. Further, the temperature adjustment means can include not only the means for cooling off the power generation unit 7 but also a heater to heat the power generation unit 7. The temperature sensor 72 detects the temperature of the power generation unit 7, and sends the temperature detection signal S3 to the control unit 10. For the temperature sensor 72, it is possible to use, for example, a thermocouple provided on the surface of the power generation unit 7 or provided inside the power generation unit 7.

A liquid is used for the fuel supplied to the anode. Hereinafter, the methanol solution is assumed as one example of the fuel. The highly concentrated fuel tank 2 stores a raw fuel such as a methanol solution having a purity of 99.9% or more, or a highly concentrated fuel including a small amount of water such as a mixed solution of methanol and water having a concentration of 10 mol/litter (mol/litter will hereinafter be referred to as "M") or more. It is to be noted that the highly concentrated fuel tank 2 can be supplied with the raw fuel or the highly concentrated fuel from an unshown supply port.

The fuel supply unit 3 has a built-in pump whose operation is controlled by the control unit 10, and is connected to the highly concentrated fuel tank 2 via the line L1 and connected to the mixing tank 4 via the line L2. When the control unit 10 drives the pump of the fuel supply unit 3, the raw fuel or the highly concentrated fuel is supplied from the highly concentrated fuel tank 2 into the mixing tank 4.

Instead of using a small electromagnetic pump as in the fuel circulation unit 5, it is possible to use for the fuel supply unit 3 a method which enables the supply of the fuel in a predetermined flow volume and which does not require drive electric power. For example, it is possible to conceive a method using a water head difference between the highly concentrated fuel tank 2 and the mixing tank 4, or a method using capillary force by a porous material.

The line L5 is a return flow path provided from the power generation unit 7 to the mixing tank 4. This line L5 functions as an anode collection path to collect a mixed solution remaining without being consumed in the anode of the power generation unit 7 (a mixed solution of the unreacted fuel and water which have not been consumed in the anode) and carbon dioxide, that is, an emission discharged from the anode.

The mixing tank 4 communicates with the fuel supply unit 3 via the line L2, and communicates, on the other hand, with an anode side of the power generation unit 7 via the line L5. In the mixing tank 4, the raw fuel or the highly concentrated fuel from the highly concentrated fuel tank 2 is mixed with the mixed solution collected from the anode of the power generation unit 7. It is to be noted that the mixing tank 4 contains a diluted methanol solution having an initial concentration ranging from 1.5M to 2.5M (initial mixture fuel) for example.

A gas-liquid separation unit 41 is attached to a connection portion between the mixing tank 4 and the line L5. The gas-liquid separation unit 41 has a gas-liquid separation film to separate a gas including carbon dioxide from the mixed solution.

The mixing tank 4 comprises detection means for obtaining information on the concentration and volume of the mixture fuel. The concentration sensor 42 can be used as means for detecting the concentration of the mixture fuel. The concentration sensor 42 is installed inside the mixing tank 4 as shown in FIG. 1, or at a proper place of the line L3, L4. However, the concentration sensor 42 is an optional component in the system of the present embodiment. This is because the concentration of the mixture fuel can also be detected by software instead of the concentration sensor (hardware). That is, the control unit 10 can possess a computer program which estimates the concentration of the mixture fuel from the output and the information on the temperature of the power generation unit 7. It is to be noted that, for example, a supersonic type or near-infrared multiple wavelength light type sensor can be used for the concentration sensor 42.

The liquid volume sensor 43 can be used as means for detecting the volume of the mixture fuel. The liquid volume sensor 43 is installed inside the mixing tank 4 as shown in FIG. 1, and detects the level of the mixture fuel in the tank 4. Instead of the liquid volume sensor (level meter) 43, it is also possible to use means for measuring the weight of the mixing tank 4 (e.g., a load cell).

The fuel circulation unit 5 circulates the mixture fuel in a loop path composed of the lines L3, L4 and L5 including the power generation unit 7 and the mixing tank 4. The fuel circulation unit 5 has a built-in pump whose operation is controlled by the control unit 10, and is connected to the mixing tank 4 via the line L3 and connected to the anode side of the power generation unit 7 via the line L4. For the fuel circulation unit 5, it is preferable to use a small electromagnetic pump in that it is small, consumes low power and allows its supply flow volume to be controlled from the outside.

The air supply unit 6 has a built-in air pump or fan whose operation is controlled by the control unit 10, and is connected to a cathode side of the power generation unit 7 via the line L6, and supplies air to the cathode of the power generation unit 7. For the air supply unit 6, it is preferable to use a small air pump or fan in that it is small and allows its supply flow volume to be controlled from the outside.

The power adjustment unit 8 is provided between the power generation unit 7 and the load 9 to smoothly take an output from the power generation unit 7 out to the load 9. A circuit in the power adjustment unit 8 is connected to an output side of the control unit 10, so that the load current I applied to the load 9 is controlled. It is to be noted that power generated in the power generation unit 7 is output to the power adjustment unit 8 via a lead wire 81.

A methanol consumption amount per unit time and unit area in the anode during power generation in a direct methanol fuel cell is expressed by the amount of methanol used in a reaction and a crossover amount of methanol moved to the anode side through the electrolytic film. Specifically, a methanol consumption amount $J^{CONS}_{CH3OH}$ in the anode is provided by Equation (1) below.

$$J^{cons}_{CH3OH} = \frac{I}{6F}(1+\beta) \qquad (1)$$

Note that "I" indicates a load current (A), "F" indicates Faraday constant, "β" indicates the ratio of a movement amount of methanol moving in a crossover manner to the amount of methanol used in a reaction during power generation.

Likewise, a consumption amount of water on the anode side is expressed by the amount of water used in a reaction and a crossover amount of water moving to the cathode side and the anode side through the electrolytic film. Specifically, a water consumption amount $J^{CONS}_{H2O}$ in the anode is provided by Equation (2) below.

$$J^{cons}_{H2O} = \frac{I}{6F}(1+6\alpha) \qquad (2)$$

Note that "α" is the ratio of a movement amount of a water molecule to the movement amount of one proton produced in a reaction. Therefore, the methanol consumption amount in the anode is proportionate to the methanol crossover amount and the load current I, and the water consumption amount is likewise proportionate to the water crossover amount and the load current I. Thus, the load current I, the methanol crossover amount and the water crossover amount are changed, and the consumption amounts of methanol and water are adjusted, thereby making it possible to control the methanol amount and water amount in the mixed solution circulating through the lines L3, L4 and L5. The present embodiment is characterized in that the crossover amounts of methanol and water are changed to control the amounts of methanol and water without significantly changing the output.

[Correlation Between Concentration C of Mixture Fuel and Parameters α, β]

Figure 2:
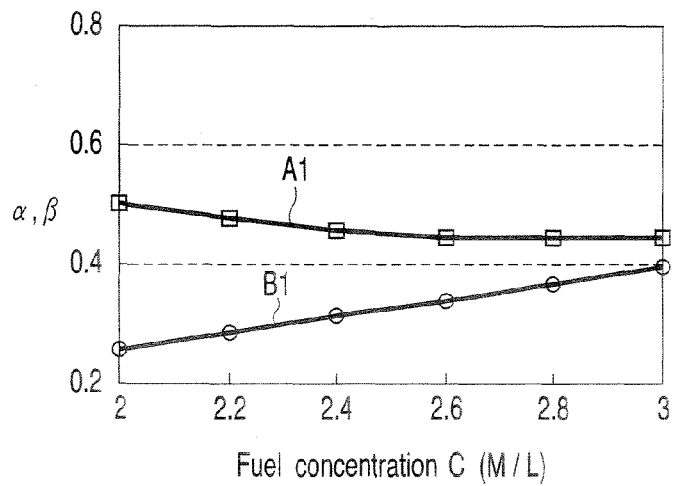
FIG. 2 is a graph showing the relationship between a concentration C of a mixture fuel and parameters α.

An experiment was carried out under the condition that the load current I was 1.8 A and an air supply amount $Qc^{Air}$ was 87 cc/min. The results are shown in FIG. 2. A characteristic curve A1 (white square plots) in FIG. 2 indicates a relation between a concentration C of the mixture fuel supplied to the anode and α, and a characteristic curve B1 (white circular plots) indicates a relation between the concentration C of the mixture fuel and β. Here, the concentration C can be detected by the concentration sensor 42. For β, a result was obtained in which it gradually increased as the concentration C of the mixture fuel became higher, and for α, a result was obtained in which it gradually decreased as the concentration C of the mixture fuel became higher. Moreover, it could be confirmed that the variation of α is relatively smaller than that of β.

[Correlation Between Air Supply Amount $Qc^{Air}$ and Parameters α, β]

An experiment was carried out using a mixture fuel having a concentration of 2M, under the condition that the load current I was 1.8 A. The results are shown in FIG. 3. A characteristic curve A2 (white square plots) in FIG. 3 indicates a relation between the air supply amount $Qc^{Air}$ and α, and a characteristic curve B2 (white circular plots) indicates a relation between the air supply amount $Qc^{Air}$ and β. If the air supply amount $Qc^{Air}$ increased, the humidity of the gas diffusion layer decreased, and α monotonously increased. The reason is that the amount of water that can be contained in the air increases, and water produced in the cathode can be contained in the supplied air in a large amount.

On the other hand, β tended to increase as the air supply amount $Qc^{Air}$ increased, but the increase was small as compared with the variation of α. In such a manner, the supply amount $Qc^{Air}$ of air to the cathode is manipulated and the humidity of the gas diffusion layer is changed, such that both the parameters α, β are adjusted and the methanol consumption amount and the water consumption amount in the line L5 can be changed. Here, a flow volume range for the air supply amount $Qc^{Air}$ is designed to provide an air supply amount equal to or greater than that necessary for the power generation in order to ensure the output of the power generation unit 7, and the air supply unit 6 is manipulated so that the range may satisfy Equation (3) below.

$$24451 \frac{I}{0.84F} < Q_c^{Air} \;(cc/s) \qquad (3)$$

Note that I indicates a load current (A) and F indicates Faraday constant.

[Correlation Between Fuel Supply Amount $Qa^{MeOH}$ and Parameters α, β]

An experiment was carried out using a mixture fuel having a concentration of 2M, under the condition that an air supply amount $Qc^{Air}$ was 87 cc/min and the load current I was 1.8 A. The results are shown in FIG. 4. A characteristic curve A3 (white square plots) in FIG. 4 indicates a change of α with respect to a fuel supply amount $Qa^{MeOH}$, and a characteristic curve B3 (white circular plots) indicates a change of β with respect to the fuel supply amount $Qa^{MeOH}$. It was found out that if the supplied mixture fuel was increased with respect to the fuel supply amount $Qa^{MeOH}$ necessary for the power generation, β increased and α decreased.

The mixture fuel in the mixing tank 4 is sent into the power generation unit 7 by the fuel circulation unit 5, and sent to the anode through the anode flow path plate. Thus, if the fuel circulation unit 5 is manipulated and the flow volume of the fuel sent to the anode is changed, it is possible to generate a change of a concentration difference between an entrance side and an exit side of the anode flow path plate because of the consumption of the fuel and water by a power generation reaction. Here, in order to make a great concentration difference between the entrance and exit of the flow path plate, it is preferable that the flow path of the anode flow path plate has a serpentine shape rather than a parallel shape. This is because the flow path of the serpentine shape makes larger fuel concentration profile across the MEA.

In such a flow path, if the fuel circulation unit 5 is manipulated and the flow volume of the mixture fuel sent to the anode is decreased, the fuel concentration at an exit of the power generation unit 7 decreases, β decreases, and α increases. On the contrary, if the flow volume of the mixture fuel sent to the anode is increased, the fuel concentration at the exit of the power generation unit 7 increases, β increases, and α decreases.

In this way, the fuel circulation unit 5 is manipulated to change the fuel supply amount $Qa^{MeOH}$, and a concentration gradient is provided in the flow path to adjust β and α, thereby making it possible to control the consumption amounts of methanol and water in the line L5. Owing to the fuel circulation unit 5, the fuel supply amount $Qa^{MeOH}$ is controlled within a range satisfying a relation of Equation (4) below by the control unit 10.

$$\frac{I}{6F}\frac{1000}{C} < Q_a^{MeOH} < \frac{I}{6F}\frac{6000}{C} (cc/s) \quad (4)$$

Note that I is the load current (A), F is Faraday constant, and C is a concentration (M) of the mixture fuel in the mixing tank. It is to be noted that the fuel supply amount $Qa^{MeOH}$ is equal to or more than the amount of the fuel necessary for the power generation reaction. Moreover, as the crossover increases, it is preferable that a variable range of the fuel supply amount $Qa^{MeOH}$ is set to a region which allows a greater change gradient of α, β with respect to a change in the fuel supply amount $Qa^{MeOH}$. Under these circumstances, considering that the region is used where the gradient of changes in α, β is great with respect to the change in the fuel supply amount $Qa^{MeOH}$, the fuel supply amount $Qa^{MeOH}$ is set to be equal to or less than six times the fuel supply amount $Qa^{MeOH}$ necessary for the power generation consumption. The reason is that even if the fuel is supplied in a fuel supply amount over six times the fuel supply amount $Qa^{MeOH}$ necessary for the power generation consumption, the changes in α, β are small for an increase of the fuel supply amount and the effects are saturated. Moreover, there is also a limitation in the fuel supply amount $Qa^{MeOH}$ of the fuel circulation unit 5.

[Correlation Between Load Current I and Parameters α, β]

An experiment was carried out under the condition that the concentration of the mixture fuel was 2M and the air supply amount $Qc^{Air}$ was 87 cc/min. The results are shown in FIG. 5. A characteristic curve A4 (white square plots) in FIG. 5 indicates a change of α with respect to the load current I, and a characteristic curve B4 (white circular plots) indicates a change of β with respect to the load current I. It was found out that if the load current I was increased, both α and β decreased, and if the load current I was decreased, both α and β increased.

[Correlation Between Temperature T of Power Generation Unit and Parameters α, β]

Figure 6:
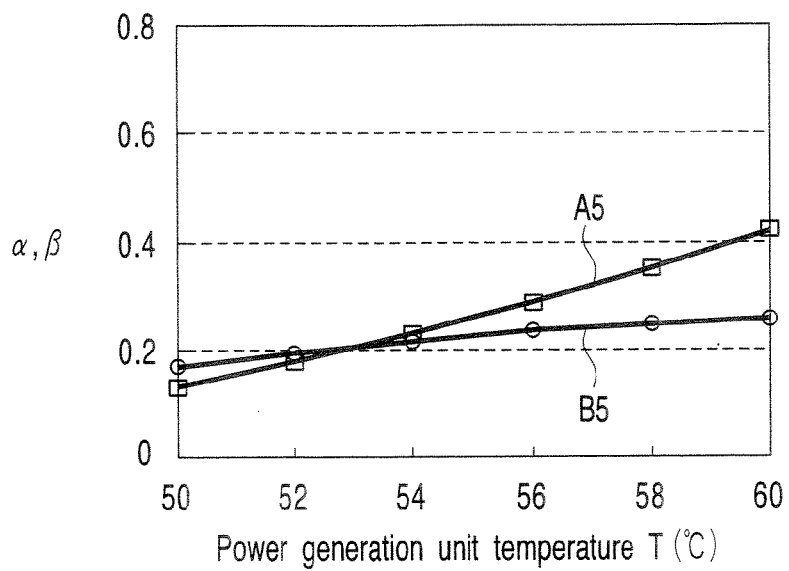
FIG. 6 is a graph showing the relationship between a power generation unit temperature T and the parameters α, β.

An experiment was carried out under the condition that the concentration of the mixture fuel was 2M and the air supply amount $Qc^{Air}$ was 87 cc/min. The results are shown in FIG. 6. A characteristic curve A5 (white square plots) in FIG. 6 indicates a change of α with respect to a power generation unit temperature T (° C.), and a characteristic curve B4 (white circular plots) indicates a change of β with respect to the temperature T. It was found out that if the temperature T was raised, both α and β increased, and if the temperature T was dropped, both α and β decreased.

Next, an outline of the operation of the fuel cell system in the present embodiment will be described.

The mixture fuel is supplied from the fuel circulation unit 5 to the anode of the power generation unit 7, and air is supplied from the air supply unit 6 to the cathode. If the system 1 is connected to the load 9 via the power adjustment unit 8, the power generation is started, and methanol and water cause an oxidative reaction in the anode, and moreover, and methanol and water are consumed by crossover movement.

The mixed solution which has not been consumed in the power generation unit 7 and carbon dioxide (reaction product) are sent into the mixing tank 4 through the line L5. At this moment, it is necessary to discharge carbon dioxide out of the system so that carbon dioxide may not circulate in the line L5 again. Thus, the gas-liquid separation unit 41 is attached to the mixing tank 4, and carbon dioxide is separated/removed from the emission by the gas-liquid separation unit 41. A commercially available general-purpose gas-liquid separation film can be used for the gas-liquid separation unit 41. Further, when a gas-liquid separation pipe is used for the gas-liquid separation unit 41, it is not exclusively placed inside the mixing tank 4, but may also be placed outside the mixing tank 4. For example, the gas-liquid separation unit 41 may be installed in the collection line L5 (see FIG. 16). It is to be noted that the raw fuel or the highly concentrated fuel equal to the flux of methanol and water consumed in the power generation unit 7 is supplied into the mixing tank 4 from the highly concentrated fuel tank 2 at a predetermined flow volume.

The concentration and volume of the mixture fuel in the mixing tank 4 are measured by the sensors 42 and 43, respectively, and the measurement data are sent to the control unit 10. The control unit 10 manipulates the fuel circulation unit 5 and the air supply unit 6 on the basis of the measurement data and predetermined process data to have proper concentration and volume of the mixture fuel in the mixing tank 4.

Next, there will be described a correlation among a concentration change dC/dt and a liquid volume change dV/dt per unit time of the mixture fuel in the mixing tank 4, and various parameters, with reference to FIGS. 7 to 11.

An experiment was carried out under the condition that the initial concentration of the mixture fuel in the mixing tank 4 was 2.0M and the liquid volume was 3.0 cc. Various correlation data described below were obtained.

[Correlation Between Fuel Supply Amount $Qconc^{MeOH}$ and dC/dt, dV/dt]

Figure 7:
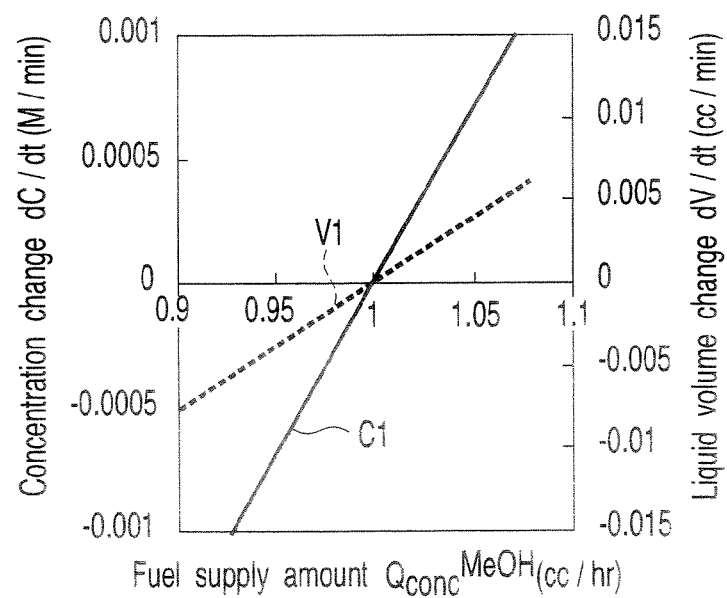
FIG. 7 is a graph showing the relationship between a fuel supply amount $Qconc^{MeOH}$, a concentration change ΔC and a liquid volume change ΔV.

A characteristic curve C1 in FIG. 7 indicates a relation between a fuel supply amount $Qconc^{MeOH}$ (cc/hr) and a concentration change dC/dt (M/min) per unit time. Further, a characteristic curve V1 indicates a relation between the fuel supply amount $Qconc^{MeOH}$ and a liquid volume change dV/dt per unit time (cc/min). $Qconc^{MeOH}$ is the flow volume of the raw fuel or the highly concentrated fuel supplied from the fuel supply unit 3 into the mixing tank 4. At this point, an operation is performed under the condition that the fuel circulation unit 5, the air supply unit 6, the power adjustment unit 8 and the power generation unit 7 are at a constant temperature.

When the fuel supply unit 3 is manipulated to change the fuel supply amount $Qconc^{MeOH}$, both the concentration change dC/dt per unit time and the liquid volume change dV/dt per unit time (cc/min) increase (characteristic curves C1, V1) as shown in FIG. 7 if the fuel supply amount $Qconc^{MeOH}$ is increased. Thus, if both the concentration and volume of the mixture fuel have decreased as a result of detecting the concentration and volume of the mixture fuel by the concentration sensor 42 and the liquid volume sensor 43, the fuel supply amount $Qconc^{MeOH}$ is increased. On the contrary, if both the concentration and volume of the mixture fuel have increased, the fuel supply amount $Qconc^{MeOH}$ is decreased. If the fuel supply unit 3 is manipulated in this manner, the concentration and volume of the mixture fuel in the mixing tank 4 can be controlled within proper ranges.

[Correlation Between Air Supply Amount $Qc^{Air}$ and dC/dt, dV/dt]

Figure 8:
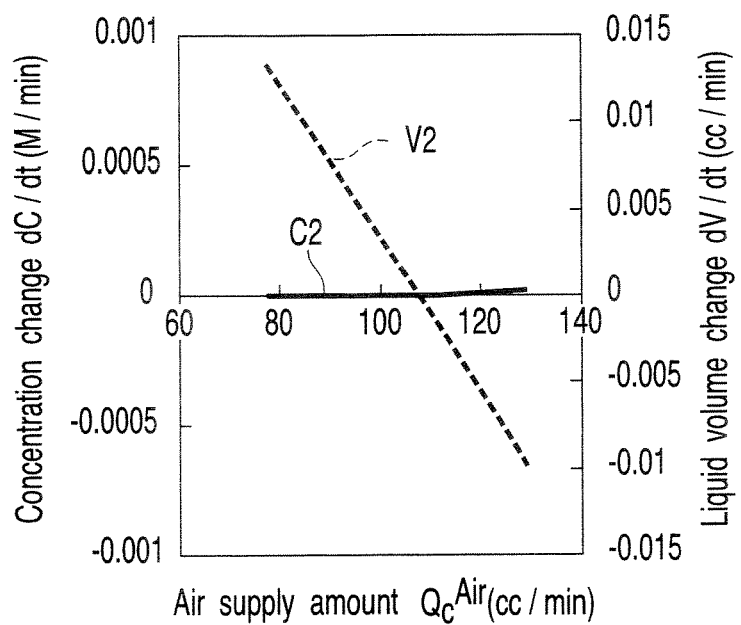
FIG. 8 is a graph showing the relationship between the air supply amount $Qc^{Air}$, the concentration change ΔC and the liquid volume change ΔV.

A characteristic curve C2 in FIG. 8 indicates a relation between the air supply amount $Qc^{Air}$ (cc/min) and the concentration change dC/dt per unit time. Further, a characteristic curve V2 indicates a relation between the air supply amount $Qc^{Air}$ and the liquid volume change dV/dt per unit time. $Qc^{Air}$ is the amount of air supplied from the air supply unit 6 to the cathode of the power generation unit 7. At this point, an operation is performed under the condition that the fuel supply unit 3, the fuel circulation unit 5, the power adjustment unit 8 and the power generation unit 7 are at a constant temperature.

When the air supply unit 6 is manipulated to change the amount $Qc^{Air}$ of air supplied to the power generation unit 7, the concentration change dC/dt per unit time makes little change (characteristic curve C2) as shown in FIG. 8, but the liquid volume change dV/dt per unit time makes a great change (characteristic curve V2). Thus, when the liquid volume sensor 43 has detected that the volume of the mixture fuel in the mixing tank 4 had decreased during operation, the control unit 10 manipulates the air supply unit 6 to reduce the air supply amount $Qc^{Air}$. On the contrary, when the liquid volume sensor 43 has detected that the volume of the mixture fuel in the mixing tank 4 is increasing, the air supply amount $Qc^{Air}$ is increased. When the liquid volume sensor 43 has detected that the volume of the mixture fuel in the mixing tank 4 had become normal, the air supply amount $Qc^{Air}$ is returned to the flow volume for steady operation. If the air supply unit 6 is manipulated in this manner, the volume of the mixture fuel in the mixing tank 4 can be controlled within the proper range.

Furthermore, when the air supply amount $Qc^{Air}$ is changed, the concentration hardly changes in contrast with the change in the liquid volume, thereby making it possible to construct a system which detects the volume of the mixture fuel to control the liquid volume without controlling the concentration of the mixture fuel.

[Correlation Between Fuel Supply Amount $Qa^{MeOH}$ and dC/dt, dV/dt]

Figure 9:
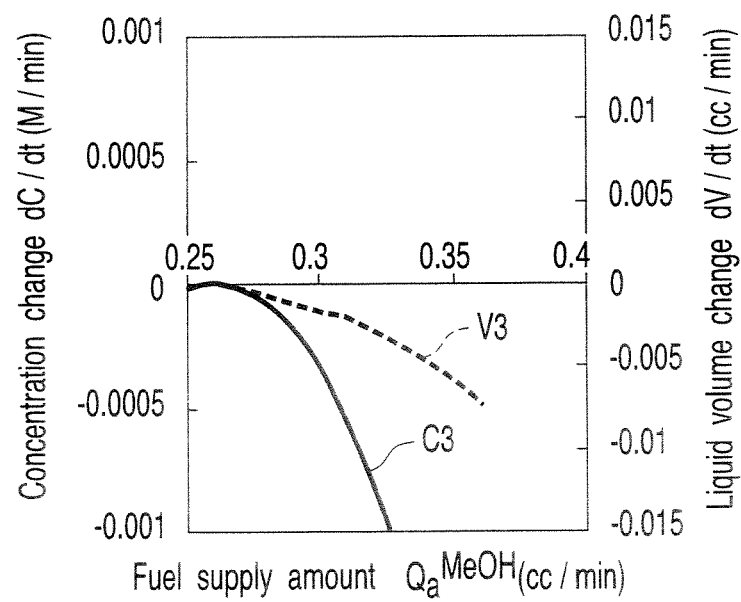
FIG. 9 is a graph showing the relationship between the fuel supply amount $Qa^{MeOH}$, the concentration change ΔC and the liquid volume change ΔV.

A characteristic curve C3 in FIG. 9 indicates a relation between the fuel supply amount $Qa^{MeOH}$ (cc/min) and the concentration change dC/dt per unit time. Further, a characteristic curve V3 indicates a relation between the fuel supply amount $Qa^{MeOH}$ and the liquid volume change dV/dt per unit time. $Qa^{MeOH}$ is the amount of the mixture fuel supplied from the fuel circulation unit 5 to the anode of the power generation unit 7. At this point, an operation is performed under the condition that the fuel supply unit 3, the air supply unit 6, the power adjustment unit 8 and the power generation unit 7 are at a constant temperature.

When the fuel circulation unit 5 is manipulated to change the fuel supply amount $Qa^{MeOH}$, both the concentration change dC/dt per unit time and the liquid volume change dV/dt per unit time decrease (characteristic curves C3, V3) as shown in FIG. 9 if the fuel supply amount $Qa^{MeOH}$ is increased. Thus, if both the concentration and volume of the mixture fuel have decreased as a result of detecting the concentration and volume of the mixture fuel by the concentration sensor 42 and the liquid volume sensor 43, the fuel supply amount $Qa^{MeOH}$ is decreased. On the contrary, if both the concentration and volume of the mixture fuel have increased, the fuel supply amount $Qa^{MeOH}$ is increased. If the fuel circulation unit 5 is manipulated in this manner, the concentration and volume of the mixture fuel in the mixing tank 4 can be controlled within the proper ranges.

[Correlation Between Load Current I and dC/dt, dV/dt]

Figure 10:
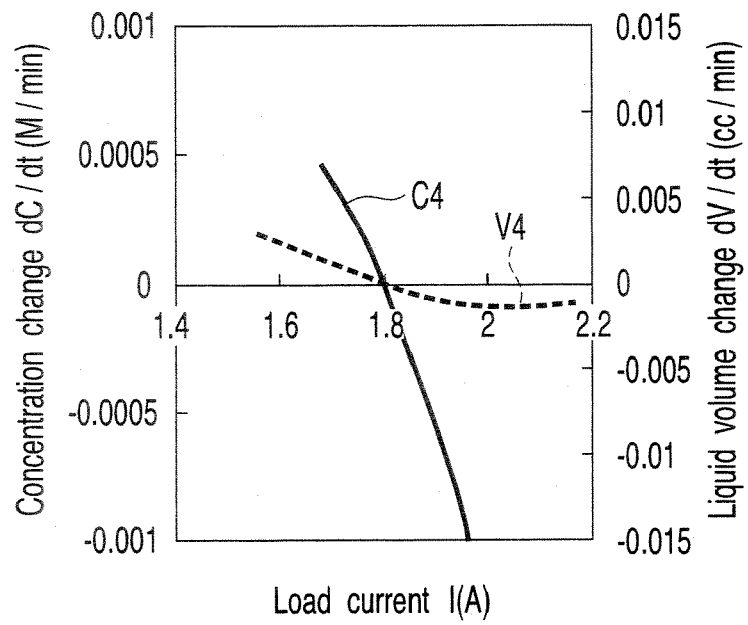
FIG. 10 is a graph showing the relationship between the load current I, the concentration change ΔC and the liquid volume change ΔV.

A characteristic curve C4 in FIG. 10 indicates a relation between the load current I and the concentration change dC/dt per unit time. Further, a characteristic curve V4 indicates a relation between the load current I and the liquid volume change dV/dt per unit time. The load current I is the value of αcurrent taken from the power generation unit 7 out to the load 9 by manipulating the power adjustment unit 8. At this point, an operation is performed under the condition that the fuel supply unit 3, the fuel circulation unit 5, the air supply unit 6 and the power generation unit 7 are at a constant temperature.

If the load current I taken out of the power generation unit 7 by manipulating the power adjustment unit 8 is increased from constant value (1.8 A), both dC/dt and dV/dt decrease (characteristic curves C4, V4) as shown in FIG. 10. Thus, if both the concentration and volume of the mixture fuel have decreased as a result of detecting the concentration and volume of the mixture fuel by the concentration sensor 42 and the liquid volume sensor 43, the load current I is decreased. On the contrary, if both the concentration and volume of the mixture fuel have increased, the load current I is increased. If the power adjustment unit 8 is manipulated in this manner, the concentration and volume of the mixture fuel in the mixing tank 4 can be controlled within the proper ranges.

The rate of changes in dC/dt and dV/dt when the load current I was changed was compared with the rates of changes in dC/dt and dV/dt when the fuel supply amount $Qconc^{MeOH}$, the air supply amount $Qc^{Air}$, the fuel supply amount $Qa^{MeOH}$ and the load current I were changed. As a result, the rate for dC/dt was higher than that for dV/dt. Thus, the manipulation of the power adjustment unit 8 makes it possible to construct a system which detects the concentration of the mixture fuel to control the concentration without controlling the volume of the mixture fuel.

[Correlation Between Temperature T of Power Generation Unit and dC/dt, dV/dt]

Figure 11:
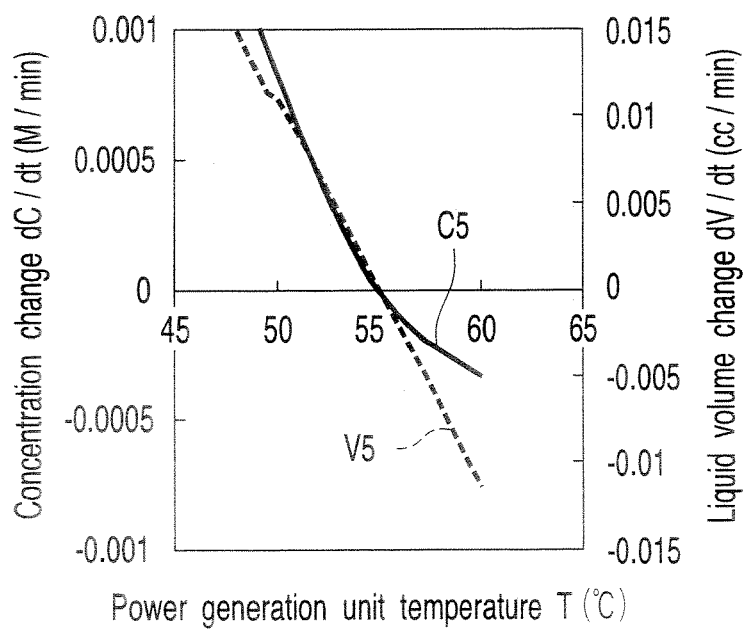
FIG. 11 is a graph showing the relationship between the power generation unit temperature T, the concentration change ΔC and the liquid volume change ΔV.

A characteristic curve C5 in FIG. 11 indicates a relation between the power generation unit temperature T (° C.) and the concentration change dC/dt per unit time. Further, a characteristic curve V5 indicates a relation between the temperature T and the liquid volume change dV/dt per unit time. The temperature T is the temperature of the power generation unit 7 measured by the temperature sensor 72 when it is air-cooled by the fan 71. At this point, an operation is performed under the condition that the operation units (the fuel supply unit 3, the fuel circulation unit 5, the air supply unit 6 and the power adjustment unit 8) other than the fan 71 are at constant values.

When the fan 71 is manipulated to change the temperature T, both dC/dt and dV/dt decrease (characteristic curves C5, V5) as shown in FIG. 11 if the temperature T is raised. Thus, if both the concentration and volume of the mixture fuel have decreased as a result of detecting the concentration and volume of the mixture fuel by the concentration sensor 42 and the liquid volume sensor 43, the temperature T is dropped. On the contrary, if both the concentration and volume of the mixture fuel have increased, the temperature T is raised. If the fan 71 is manipulated in this manner, the concentration and volume of the mixture fuel in the mixing tank 4 can be controlled within the proper ranges.

In the above embodiment, the method has been described in which one of the fuel supply unit 3, the air supply unit 6, the fuel circulation unit 5, the power adjustment unit 8 and the fan 71 is manipulated to control the concentration and volume of the mixture fuel. On the contrary, an alternative method can also be employed in which a combination of the fuel supply unit 3, the fuel circulation unit 5, the power adjustment unit 8 and the fan 71 is manipulated. In such an alternative method, these operation units are combined to allow a wider control domain, for example, when the concentration and the liquid volume are increased/decreased the other way around.

[Control of Concentration and Volume of Mixture Fuel by Air Supply Unit and Fuel Circulation Unit]

Next, there will be described referring to a flowchart in FIG. 12 a method in which the air supply unit 6 and the fuel circulation unit 5 are manipulated to control the concentration and volume of the mixture fuel in the mixing tank 4 in the above fuel cell system 1.

In the present system 1, there are included, during the operation of the power generation unit 7, a step of detecting the concentration of the mixture fuel in the mixing tank 4, and a step of detecting the volume of the mixture fuel. Detected information is processed in the control unit 10 in the following manner.

A schematic configuration of the control unit 10 is shown in FIG. 13. The control unit 10 comprises the control database 30 having various process data, and the processing unit 20 which decides an operation condition from the various detection signals S1, S2 and S3 and the process data and provides the manipulation command signals to the respective operation units (the fuel circulation unit 5, the air supply unit 6, etc.).

As shown in FIG. 13, the control database 30 stores as the process data a table including the correlation data which relates the fuel supply amount $Qa^{MeOH}$ and the air supply amount $Qc^{Air}$ with $\alpha$, $\beta$. Further, since $\alpha$ also varies with the power generation unit temperature T and/or the load current I, the control database 30 also stores the correlation data which relates parameters T, I values with a complemented value of $\alpha$. Moreover, in addition to the above correlation data, the control database 30 also stores data on a time response from the manipulation of the fuel circulation unit 5 and the air supply unit 6 to changes of $\alpha$, $\beta$.

The control unit 10 uses the process data in the control database 30 to calculate output signals to be sent to the fuel circulation unit 5 and the air supply unit 6, and outputs the manipulation command signals to the fuel circulation unit 5 and the air supply unit 6 on the basis of the calculated values.

The concentration detection signal S1 and the liquid volume (level) detection signal S2 of the mixture fuel are sent to the processing unit 20. The processing unit 20 judges the state of the concentration and volume of the mixture fuel from the signals S1 and S2. A method of judging the state of the concentration and volume of the mixture fuel include a method of judging acceptability using threshold values for the respective parameters, or a method in which sampling is performed at regular time intervals to measure the concentration and volume of the mixture fuel in the mixing tank 4, and a judgment is made from variations in the concentration and volume.

The following scheme is employed for the process in which the control unit 10 reads the data from the control database 30 and sends the manipulation command signals to the fuel circulation unit 5 and the air supply unit 6 through the processing unit 20.

Initially, a difference between an upper limit value or a lower limit value in a region within proper ranges of the concentration and volume of the mixture fuel and the detection signals S1 and S2 is obtained, and moreover, $\Delta C(M)$ and $\Delta V(cc)$ are obtained. Then, the consumption of methanol and water in the power generation unit is changed on the basis of Equations (5) and (6) below.

$$C = \frac{(1+\beta)}{(1+\beta)*\frac{32}{0.79} + (1+6\alpha)*18} \quad (5)$$

$$V = \frac{(1+\beta)}{6F}I*\frac{32}{0.79} + \frac{(1+6\alpha)}{6F}*18I \quad (6)$$

In order to control both the concentration and volume of the mixture fuel, weighting factors $a_1$, $b_1$ are added as necessary as in Equation (7) below so that the control is performed considering both the concentration and volume.

$$f = a_1(D_1-D_0) + b_1(L_1-L_0) \quad (7)$$

Note that $D_0$: a concentration (M) of the mixture fuel consumed in the power generation unit during rated operation
$D_1$: a concentration (M) of the mixture fuel consumed in the power generation unit during control operation
$L_0$: a consumption speed (cc/s) of the mixture fuel in the power generation unit during rated operation
$L_1$: a consumption speed (cc/s) of the mixture fuel in the power generation unit during control operation
$a_1$: a weighting factor of the concentration
$b_1$: a weighting factor of the consumption speed The concentration $D_0$ and the consumption speed $L_0$ of the mixture fuel are values primarily decided from $\alpha$, $\beta$ during rated operation, and have been provided in advance to the control unit 10 of the present control system 1.

For example, when the fuel concentration change $\Delta C$ in the mixing tank 4 is a positive value, the control unit 10 selects the parameters $\alpha$, $\beta$ from the correlation data in the control database 30 on the basis of Equations (5) and (7) above. The selected $\alpha$, $\beta$ change the concentration of the mixture fuel consumed in the power generation unit 7 from the concentration $D_0$ to the concentration $D_1$ ($D_0<D_1$). When the parameters $\alpha$, $\beta$ are selected, values of the air supply amount $Qc^{Air}$ and the fuel supply amount $Qa^{MeOH}$ are primarily decided from the correlation data. The processing unit 20 performs an operation on the basis of the values of $Qc^{Air}$ and $Qa^{MeOH}$, and outputs the manipulation command signals S4 and S5 to the air supply unit 6 and the fuel circulation unit 5, respectively. In this way, the present system 1 is operated under control, and the concentration of the mixture fuel consumed in the power generation unit 7 changes from the concentration $D_0$ to concentration $D_1$.

Furthermore, for example, when the liquid volume change $\Delta V$ is a positive value, the control unit 10 selects the parameters $\alpha$, $\beta$ from the correlation data in the control database 30 on the basis of Equations (6) and (7) above. The selected $\alpha$, $\beta$ change the consumption speed of the mixture fuel in the power generation unit from the consumption speed $L_0$ to the consumption speed $L_1$ ($L_0<L_1$). When the parameters $\alpha$, $\beta$ are selected, the values of the air supply amount $Qc^{Air}$ and the fuel supply amount $Qa^{MeOH}$ are primarily decided from the correlation data. The processing unit 20 performs an operation on the basis of the values of $Qc^{Air}$ and $Qa^{MeOH}$, and outputs the signals S4 and S5 to the air supply unit 6 and the fuel circulation unit 5, respectively. In this way, the present system 1 is operated under control, and the consumption speed of the mixture fuel in the power generation unit 7 changes from the consumption speed $L_0$ during rated operation to the consumption speed $L_1$ during control operation.

Methods of controlling the fuel circulation unit 5 include a method in which the frequency and rotation number of a liquid sending pump are changed, and a method in which, for example, a throttle (orifice) is provided in the fuel circulation unit 5, and pressure loss is provided before and after the throttle to control the flow volume. When an air pump is provided in the air supply unit 6, the frequency and rotation number of the pump are changed. When a fan is provided in the air supply unit 6, the rotation number of the fan is changed. When a throttle (orifice) is provided in the air supply unit 6, throttles can be provided at an entrance and exit of the air supply unit 6 to change the pressure loss.

Figure 12:
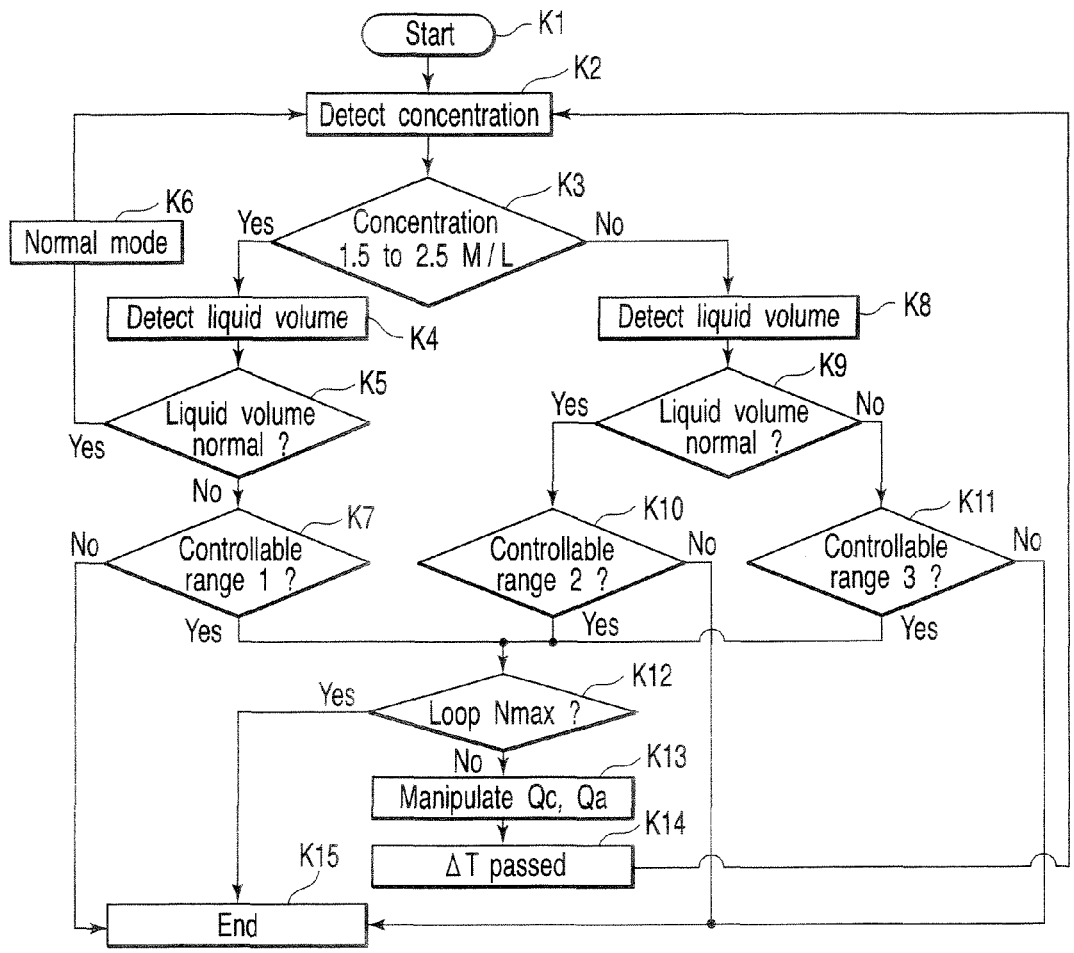
FIG. 12 is a flowchart when the concentration and volume of a fuel are controlled in the embodiment of the present invention.

As shown in FIG. 12, the concentration of the mixture fuel is first detected by the concentration sensor 42, and the processing unit 20 judges whether or not the concentration of the mixture fuel is within a predetermined range. In the present embodiment, the predetermined range is 1.5M to 2.5M which is a region where the output of the power generation unit 7 can keep a certain level or more. The liquid volume sensor 43 detects a volume V of the mixture fuel, and the processing unit 20 judges on the basis of the detected liquid volume V whether or not the volume of the mixture fuel is within a predetermined range. When the volume of the mixture fuel is within the predetermined range, both the concentration and volume of the mixture fuel are within the predetermined ranges, thus maintaining the current air supply amount $Qc^{Air}$ and fuel supply amount $Qa^{MeOH}$ (K1→K2→ K3→ K4→ K5→K6).

Next, when the concentration of the mixture fuel is within the predetermined range, the volume of the mixture fuel is detected by the liquid volume sensor 43. When it has been judged that this detected liquid volume is not within the predetermined range, it is judged whether or not the volume of the mixture fuel is controllable (K1→K2→K3→K4→K5→K7). Here, as to whether or not the volume of the mixture fuel is controllable, a predetermined upper limit value and lower limit value are preset, and the detected liquid volume is judged to be controllable when it is within a range from the upper limit value to the lower limit value, while the detected liquid volume is judged to be uncontrollable when it is out of this range. When the detected liquid volume has been judged to be uncontrollable, processing is terminated (K7→K15).

When the detected liquid volume has been judged to be controllable, the control unit 10 selects the parameters α, β, and decides the value of the air supply amount $Qc^{Air}$ and the value of the fuel supply amount $Qa^{MeOH}$ which will be the selected parameters α, β, and then outputs, on the basis of these values, the signals S4 and S5 to the air supply unit 6 and the fuel circulation unit 5, respectively. This restrains the variation from the concentration $D_0$ (during rated operation) to the concentration $D_1$ (during control operation) of the mixture fuel (a decrease in an absolute value $|D_1-D_0|$), and increases the variation from the consumption speed $L_0$ (during rated operation) to the consumption speed $L_1$ (during control operation) of the mixture fuel (an increase in an absolute value $|L_1-L_0|$).

After a predetermined time ΔT has passed from the output of the manipulation command signals S4 and S5, if the volume of the mixture fuel is within a predetermined target range, the air supply amount $Qc^{Air}$ and the fuel supply amount $Qa^{MeOH}$ are brought to the values during rated operation, and on the basis of these values, the signals S4 and S5 are output to the fuel circulation unit 5 and the air supply unit 6, respectively (K7→K12→K13→K14→K2→K3→K4→K5→K6). Further, when the volume of the mixture fuel is not within the predetermined range even after the predetermined time ΔT has passed, a control loop is repeated until the volume falls within the predetermined range. However, the volume of the mixture fuel does not fall within the predetermined range even if the control loop is repeated N times, processing of the control loop is terminated (K7→K12→ K13→ K14→ K2→K3→K4→K5→K7→K12→K15).

When the concentration of the mixture fuel is not within the predetermined range, the volume of the mixture fuel is then detected, and the processing unit 20 judges whether or not the volume of the mixture fuel is within the predetermined range. Then, when the volume of the mixture fuel is within the predetermined range, the concentration of the mixture fuel is abnormal, so that it is judged whether or not the concentration of the mixture fuel is controllable (K1→ K2→ K3→ K8→K9→K10). Here, when the concentration of the mixture fuel is within a controllable range, the concentration of the mixture fuel is in a region (region between the predetermined upper limit value and lower limit value) of the concentration of the mixture fuel where the power generation unit 7 can generate power. In the present embodiment, a range from a lower limit value 1.0M to an upper limit value 3.0M is judged to be controllable. On the other hand, when the concentration of the mixture fuel is out of this range, it is judged to be uncontrollable. When it has been judged to be uncontrollable, the operation is terminated (K10→K15).

When the concentration has been judged to be uncontrollable, the control unit 10 selects the parameters α, β which increase the variation from the concentration $D_0$ to the concentration $D_1$ of the mixture fuel and which restrain the variation from the consumption speed $L_0$ to the consumption speed $L_1$ of the mixture fuel, and decides the values of the air supply amount $Qc^{Air}$ and the fuel supply amount $Qa^{MeOH}$ which will be the selected parameters α, β, and then outputs, on the basis of these values, the manipulation command signals S4 and S5 to the air supply unit 6 and the fuel circulation unit 5, respectively. Further, when the concentration of the mixture fuel is within the predetermined range after the predetermined time ΔT has passed from the output of the manipulation command signals, the air supply amount $Qc^{Air}$ and the fuel supply amount $Qa^{MeOH}$ are brought to the values during rated operation, and, on the basis of these values, the manipulation signals are output to the fuel circulation unit 5 and the air supply unit 6 (K10→K12→K13→ K14→K2→ K3→K4→K5→K6). Further, when the concentration of the mixture fuel does not fall within the predetermined range even after the predetermined time ΔT has passed, the control loop is repeated. However, when the concentration of the mixture fuel does not fall within the predetermined range even if the control loop is repeated N times, the processing of the control loop is terminated (K10→K12→K13→ K14→K2→ K3→K8→K9→K10→K12→K15).

When the processing unit 20 has judged that the concentration of the mixture fuel is not within the predetermined range and that the volume thereof is not within the predetermined range either, it moves to a procedure of controlling the concentration and volume of the mixture fuel. Further, it is judged whether or not the concentration and volume of the mixture fuel are controllable (K1→K2→ K3→K8→K9→K11). Here, when the concentration of the mixture fuel is within a controllable range, the concentration of the mixture fuel is in a region (region between the predetermined upper limit value and lower limit value) of the concentration of the mixture fuel where the power generation unit 7 can generate power. In the present embodiment, it is judged that a range from a lower limit value 1.0M to an upper limit value 3.0M is controllable. On the other hand, when the concentration of the mixture fuel is out of this range, it is judged to be uncontrollable. When it has been judged to be uncontrollable, the operation is terminated (K11→K15).

When the concentration has been judged to be controllable, the control unit 10 adds the weighting factor $a_1$ of the change from the concentration $D_0$ to the concentration $D_1$ to decide the concentration $D_1$ of the mixture fuel, and adds the weighting factor $b_1$ of the change from the consumption speed $L_0$ to the consumption speed $L_1$ to decide the consumption speed $L_1$ the mixture fuel. Then, the control unit 10 selects α, β corresponding to the above, and decides the values of the air supply amount $Qc^{Air}$ and the fuel supply amount $Qa^{MeOH}$ which will be the selected α, β, and then outputs, on the basis of these values, the manipulation command signals to the air supply unit 6 and the fuel circulation unit 5. Further, when the volume and concentration of the mixture fuel are within the predetermined ranges after the predetermined time ΔT has passed from the output of the manipulation command signals, the air supply amount $Qc^{Air}$ and the fuel supply amount $Qa^{MeOH}$ are brought to the values during rated operation, and, on the basis of these values, the manipulation signals are output to the fuel circulation unit 5 and the air supply unit 6 (K11→K12→K13→K14→K2→K3→K4→K5→K6). Further, when the concentration and volume of the mixture fuel do not fall within the predetermined ranges even after the predetermined time ΔT has passed, the control loop is repeated. However, when the concentration and volume of the mixture fuel do not fall within the predetermined ranges even if the control loop is repeated N times, the processing of the control loop is terminated (K11→K12→ K13→ K14→ K2→K3→K8→K9→K11→K12→K15).

In connection with the fuel cell system and the method of controlling the fuel cell system according to the present embodiment which have been achieved in the above manner, if control contents of the control unit 10 are individually viewed, the fuel circulation unit 5 is controlled to change the fuel supply amount $Qa^{MeOH}$ so that the crossover amounts of methanol and water are changed (FIG. 4), thereby making it possible to control both the concentration and volume of the mixture fuel consumed in the power generation unit 7 (FIG. 9).

Furthermore, the air supply unit 6 is controlled to change the air supply amount $Qc^{Air}$ so that the crossover amounts of methanol and water are changed (FIG. 3), thereby making it possible to control the volume of the mixture fuel consumed in the power generation unit 7 (FIG. 8).

Second Embodiment

Next, a second embodiment of the present invention will be described.

In the second embodiment, a fuel circulation unit 5 or an air supply unit 6 is controlled to adjust the concentration and volume of a mixture fuel, and a power adjustment unit 8 is controlled to change a load current I.

When the power adjustment unit 8 is controlled, a concentration change dC/dt per unit time can be much greater than a liquid volume change dV/dt per unit time as shown in FIG. 10. On the other hand, when the air supply unit 6 is controlled, the concentration change dC/dt per unit time is very small as compared with the liquid volume change dV/dt per unit time as shown in FIG. 8. Therefore, while the fuel circulation unit 5 and the air supply unit 6 are controlled, the load current I is controlled in the power adjustment unit 8.

It is to be noted that conditions for the power adjustment unit 8 to control the load current I are (1) and (2) below.

(1) A case where it has been judged that a concentration C and a liquid volume V of the mixture fuel can not be controlled within predetermined ranges by controlling a fuel supply amount $Qa^{MeOH}$ and an air supply amount $Qc^{Air}$ without considering the load current I.

(2) A case where both ΔC and ΔV have decreased or increased under the condition (1) above.

In a fuel cell system 1 shown in FIG. 1, the power adjustment unit 8 is connected with a control unit 10 to control the load current I taken from a power generation unit 7 and supplied to a load 9. That is, the control unit 10 can control the load current I by outputting a manipulation signal S8 to the power adjustment unit 8. Regarding a range of control of the load current I, in order to prevent an anode side from being short of a fuel and prevent en electrode from having its polarity inverted, a current in a region where there is the fuel supply amount $Qa^{MeOH}$ necessary for power generation is set as a maximum load current value $I^{max}$(A), so that a change is made in a region below the load current I to satisfy Equation (8) below.

$$I^{max}(A) < Q_a^{MeOH} \frac{6FC}{1000} \quad (8)$$

Note that the fuel supply amount $Qa^{MeOH}$ is a fuel supply amount (cc/min) of the mixture fuel supplied to the anode, F is Faraday constant, and C is a concentration (M) of the mixture fuel. The amount of the fuel supplied from a highly concentrated fuel tank 2 to a mixing tank 4 is constant in the same flow volume as that under the condition in the first embodiment.

Figure 14:
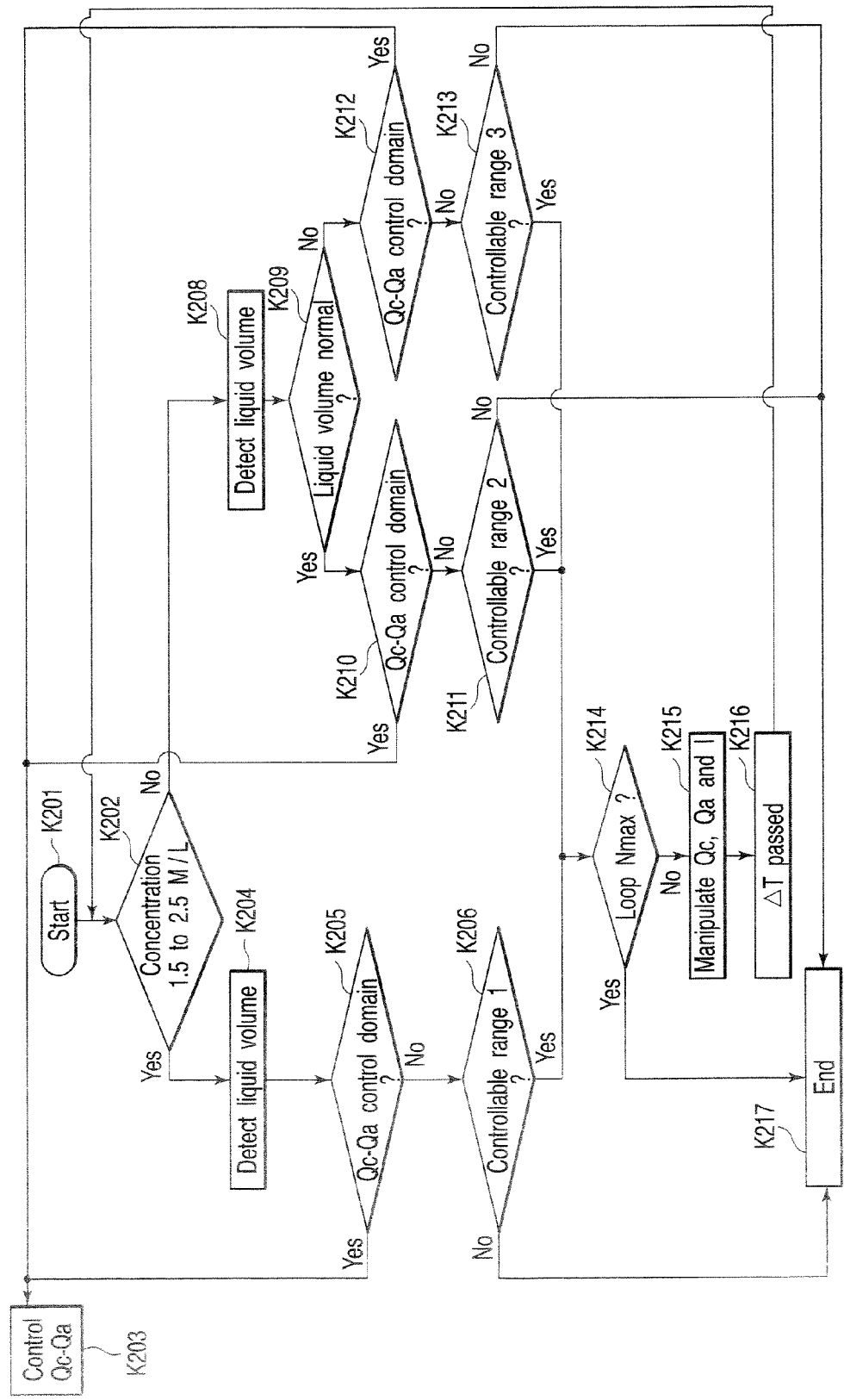
FIG. 14 is a flowchart when the concentration and volume of a fuel are controlled in another embodiment.

A control flowchart of the present embodiment is shown in FIG. 14. Initially, a concentration sensor 42 is used to detect the concentration of the mixture fuel, and a processing unit 20 judges whether or not the concentration of the mixture fuel is within a predetermined range. In the present embodiment, the predetermined range is 1.5M to 2.5M which is a region where the output of the power generation unit 7 can keep a certain level or more. Here, when the concentration of the mixture fuel is within the predetermined range, a liquid volume sensor 43 is used to detect the volume of the mixture fuel, thus judging whether or not the volume of the mixture fuel can be controlled with the air supply amount $Qc^{Air}$ and the fuel supply amount $Qa^{MeOH}$ (K202→K204→K205). Here, as to whether or not the volume of the mixture fuel is controllable, a predetermined upper limit value and lower limit value are preset, and the volume can be judged to be controllable when it is below the upper limit value or above the lower limit value, while the volume can be judged to be uncontrollable when it is above the upper limit value or below the lower limit value.

When it has been judged that the volume of the mixture fuel can be controlled with the air supply amount $Qc^{Air}$ and the fuel supply amount $Qa^{MeOH}$, the volume of the mixture fuel can be controlled with the air supply amount $Qc^{Air}$ and the fuel supply amount $Qa^{MeOH}$, thus moving to control by the air supply amount $Qc^{Air}$ and the fuel supply amount $Qa^{MeOH}$, for example, control shown in FIG. 12 (K205→K203). On the other hand, when the volume of the mixture fuel has been judged to be uncontrollable, it is then judged whether or not the volume can be controlled with the air supply amount $Qc^{Air}$, the fuel supply amount $Qa^{MeOH}$ and the load current I. Here, as to whether or not the volume of the mixture fuel is controllable, a predetermined upper limit value and lower limit value are preset, and the detected liquid volume is judged to be controllable when it is within a range from the upper limit value to the lower limit value, while the detected liquid volume is judged to be uncontrollable when it is out of this range. When the detected liquid volume has been judged to be uncontrollable, processing is terminated (K205→K206→K217).

When the detected liquid volume has been judged to be controllable, the current judgment contains a situation where the concentration of the mixture fuel is normal and the volume of the mixture fuel can not be controlled with the air supply amount $Qc^{Air}$ and the fuel supply amount $Qa^{MeOH}$ but can be controlled with the air supply amount $Qc^{Air}$, the fuel supply amount $Qa^{MeOH}$ and the load current I, thus moving to step K215 of controlling the air supply amount $Qc^{Air}$, the fuel supply amount $Qa^{MeOH}$ and the load current I (K206→K214→K215). The manipulated variables of the fuel circulation unit 5, the air supply unit 6 and the power adjustment unit 8 are controlled to adjust $Qc^{Air}$, and the load current I, and a control loop operation of steps K215→K216→K202→K204→K205→K206→K214 is performed. Then, when the volume of the mixture fuel does not become normal even if the control loop operation to manipulate the fuel circulation unit 5, the air supply unit 6 and the power adjustment unit 8 is performed a certain number of times or more, the control loop is escaped to terminate the processing (K214→K217; time limited).

Specifically, the control unit 10 selects parameters α, β from correlation data in a control database 30 when it has been judged that the concentration C of the mixture fuel is proper and that the volume V of the mixture fuel can not be controlled by the manipulation of the air supply amount $Qc^{Air}$ and the fuel supply amount $Qa^{MeOH}$ but it can be controlled by the manipulation of the air supply amount $Qc^{Air}$, the fuel supply amount $Qa^{MeOH}$ and the load current I. Regarding the selected α, β, a difference between a concentration $D_1$ (during control operation) and a concentration $D_0$ (during rated operation) is narrowed down (a decrease in an absolute value $|D_1-D_0|$), and a difference between a consumption speed $L_1$ (during control operation) and a consumption speed $L_0$ (during rated operation) is widened (an increase in an absolute value $|L_1-L_0|$) so that the concentration of the mixture fuel consumed in the power generation unit 7 falls within a range from 1.5M to 2.5M.

The control unit 10 decides the value of the air supply amount $Qc^{Air}$, the value of the fuel supply amount $Qa^{MeOH}$ and the value of the load current I from the selected α, β, and outputs, on the basis of these values, manipulation command signals S5, S4 and S8 to the air supply unit 6, the fuel circulation unit 5 and the power adjustment unit 8. When the volume V of the mixture fuel is within the predetermined range after a predetermined time ΔT has passed from the output of the manipulation command signals, the manipulation signals S5, S4 and S8 are output to the air supply unit 6, the fuel circulation unit 5 and the power adjustment unit 8 to return the values of the air supply amount $Qc^{Air}$, the fuel supply amount $Qa^{MeOH}$ and the load current I to the values during rated operation (K203→K1→ K2→ K3→ K4→K5→K6). Further, when the volume of the mixture fuel does not fall within the predetermined range even after the predetermined time ΔT has passed, the loop is repeated until the volume falls within the predetermined range. However, when the volume of the mixture fuel does not fall within the predetermined range even if the loop is repeated N times, the processing of the control loop is terminated (K206→K214→K217).

In addition, when it has been judged that the concentration of the mixture fuel is normal and the volume of the mixture fuel can be controlled with the air supply amount $Qc^{Air}$ and the fuel supply amount $Qa^{MeOH}$, the control unit 10 manipulates the fuel circulation unit 5 and the air supply unit 6, and thus performs the control loop operation shown in FIG. 12 to control the concentration C and the volume V (K203). When it has been judged that the concentration of the mixture fuel is normal and that the volume of the mixture fuel can not be controlled with the air supply amount $Qc^{Air}$ and the fuel supply amount $Qa^{MeOH}$ but can be controlled with the air supply amount $Qc^{Air}$, the fuel supply amount $Qa^{MeOH}$ and the load current I, the control unit 10 again manipulates the fuel circulation unit 5, the air supply unit 6 and the power adjustment unit 8 to control the volume V while holding the concentration C within a proper range.

Furthermore, when the concentration of the mixture fuel is not within the predetermined range, the volume of the mixture fuel is then detected, and the processing unit 20 judges whether or not the volume of the mixture fuel is within the predetermined range. When the volume of the mixture fuel is within the predetermined range, it is judged whether or not the volume can be controlled with the air supply amount $Qc^{Air}$ and the fuel supply amount $Qa^{MeOH}$ (K202→ K208→ K209→K210).

In the present embodiment, the concentration of the mixture fuel can be judged to be controllable when it is within a range above the lower limit value 1.0M and below the upper limit value 3.0M, while the concentration can be judged to be uncontrollable when it is out of this range. When the volume of the mixture fuel can be controlled with the air supply amount $Qc^{Air}$ and the fuel supply amount $Qa^{MeOH}$, it can be controlled with the air supply amount $Qc^{Air}$ and the fuel supply amount $Qa^{MeOH}$, thus moving to control by the air supply amount $Qc^{Air}$ and the fuel supply amount $Qa^{MeOH}$, for example, control shown in FIG. 12 (K203).

On the other hand, when the volume of the mixture fuel has been judged to be uncontrollable, it is then judged whether or not the volume can be controlled with the air supply amount $Qc^{Air}$, the fuel supply amount $Qa^{MeOH}$ and the load current I (K210→K211). Here, as to whether or not the volume of the mixture fuel is controllable, a predetermined upper limit value and lower limit value are preset, and the volume can be judged to be controllable when it is within a range below the upper limit value and above the lower limit value, while the volume can be judged to be uncontrollable when it is out of this range. When the volume has been judged to be uncontrollable, processing is terminated (K211→K217).

When the volume has been judged to be controllable, the current judgment contains a situation where the concentration of the mixture fuel is not within the predetermined range and the volume V of the mixture fuel can not be controlled with the air supply amount $Qc^{Air}$ and the fuel supply amount $Qa^{MeOH}$ but can be controlled with the air supply amount $Qc^{Air}$, the fuel supply amount $Qa^{MeOH}$ and the load current I, thus moving to step K215 of controlling the air supply amount $Qc^{Air}$, the fuel supply amount $Qa^{MeOH}$ and the load current I (K211→K214→K215). The manipulated variables of the fuel circulation unit 5, the air supply unit 6 and the power adjustment unit 8 are controlled to adjust $Qc^{Air}$, $Qa^{MeOH}$ and the load current I, and a control loop operation of steps K215→K216→K202→K208→K209→K210→K211→K214 is performed. Then, when the volume of the mixture fuel does not become normal even if the control loop operation to manipulate the fuel circulation unit 5, the air supply unit 6 and the power adjustment unit 8 is performed a certain number of times or more, the control loop is escaped to terminate the processing (K214→K217; time limited).

Specifically, the control unit 10 selects α, β as in the first embodiment when it has been judged that the concentration C of the mixture fuel is not within the predetermined range and that the volume V of the mixture fuel can not be controlled with the air supply amount $Qc^{Air}$ and the fuel supply amount $Qa^{MeOH}$ but it can be controlled with the air supply amount $Qc^{Air}$, the fuel supply amount $Qa^{MeOH}$ and the load current I. By use of the selected α, β, the control unit 10 increases a change from the concentration $D_0$ to the concentration $D_1$ of the mixture fuel consumed in the power generation unit 7 so that the concentration C of the mixture falls within the predetermined range from 1.5M to 2.5M, and restrains a change from the consumption speed $L_0$ to the consumption speed $L_1$ of the mixture fuel. That is, the value of the air supply amount $Qc^{Air}$, the value of the fuel supply amount $Qa^{MeOH}$ and the value of the load current I which will be the selected α, β are decided, and on the basis of these values, the manipulation command signals S5, S4 and S8 are output to the air supply unit 6, the fuel circulation unit 5 and the power adjustment unit 8.

When the concentration C of the mixture fuel is within the predetermined range after the predetermined time ΔT has passed from the output of the manipulation command signals, the control unit 10 outputs the manipulation signals S5, S4 and S8 to the air supply unit 6, the fuel circulation unit 5 and the power adjustment unit 8 to return the air supply amount $Qc^{Air}$, the fuel supply amount $Qa^{MeOH}$ and the load current I to the values during rated operation (K203→ K1→ K2→K3→K4→K5→K6). Further, when the concentration C of the mixture fuel does not fall within the predetermined range even after the predetermined time ΔT has passed, the loop is repeated until the concentration C falls within the predetermined range. However, when the concentration of the mixture fuel does not fall within the predetermined range even if the loop is repeated N times, the loop is terminated (K211→K214→K217).

In addition, when it has been judged that the concentration of the mixture fuel is normal and the volume of the mixture fuel can be controlled with the air supply amount $Qc^{Air}$ and the fuel supply amount the control unit 10 manipulates the fuel circulation unit 5 and the air supply unit 6, and thus performs the control loop operation shown in FIG. 12 to control the concentration C and the volume V (K203). When it has been judged that the concentration of the mixture fuel is normal and that the volume of the mixture fuel can not be controlled with the air supply amount $Qc^{Air}$ and the fuel supply amount $Qa^{MeOH}$ but can be controlled with the air supply amount $Qc^{Air}$, the fuel supply amount $Qa^{MeOH}$ and the load current I, the control unit 10 again manipulates the fuel circulation unit 5, the air supply unit 6 and the power adjustment unit 8 to control the concentration C while holding the volume V within a proper range.

When the processing unit 20 has judged that the concentration of the mixture fuel is not within the predetermined range and that the volume thereof is not within the predetermined range either, it judges whether or not they can be controlled with the air supply amount $Qc^{Air}$ and the fuel supply amount $Qa^{MeOH}$ (K204→K208→K209→K212).

In the present embodiment, the concentration of the mixture fuel can be judged to be controllable when it is within a range above the lower limit value 1.0M and below the upper limit value 3.0M, while the concentration can be judged to be uncontrollable when it is out of this range. When it has been judged that the volume of the mixture fuel can be controlled with the air supply amount $Qc^{Air}$ and the fuel supply amount $Qa^{MeOH}$, it can be controlled with the air supply amount $Qc^{Air}$ and the fuel supply amount $Qa^{MeOH}$, thus moving to control by the air supply amount $Qc^{Air}$ and the fuel supply amount $Qa^{MeOH}$, for example, control shown in FIG. 12 (K212→K203).

On the other hand, when the volume of the mixture fuel has been judged to be uncontrollable, it is then judged whether or not the volume can be controlled by the manipulation of the air supply amount $Qc^{Air}$, the fuel supply amount $Qa^{MeOH}$ and the load current I (K212→K213). Here, as to whether or not the volume of the mixture fuel is controllable, a predetermined upper limit value and lower limit value are preset, and the volume can be judged to be controllable when it is within a range from the upper limit value to the lower limit value, while the volume can be judged to be uncontrollable when it is out of this range. When the volume has been judged to be uncontrollable, processing is terminated (K213→K217).

When the volume has been judged to be controllable, a transition is made to step K215 of controlling the air supply amount $Qc^{Air}$, the fuel supply amount $Qa^{MeOH}$ and the load current I (K213→K214→K215). The manipulated variables of the fuel circulation unit 5, the air supply unit 6 and the power adjustment unit 8 are controlled to adjust $Qc^{Air}$, $Qa^{MeOH}$ and the load current I, and a control loop operation of steps K214→K215→K216→ K202→K208→ K209→ K212→K213→K214 is performed. Then, when the volume of the mixture fuel does not become normal even if the control loop operation to manipulate the fuel circulation unit 5, the air supply unit 6 and the power adjustment unit 8 is performed a certain number of times or more, the control loop is escaped to terminate the processing (K214→K217; time limited).

Specifically, when it has been judged that both the concentration and volume of the mixture fuel are not within the predetermined ranges, and that the volume of the mixture fuel can not be controlled with the air supply amount $Qc^{Air}$ and the fuel supply amount $Qa^{MeOH}$ but it can be controlled with the air supply amount $Qc^{Air}$, the fuel supply amount $Qa^{MeOH}$ and the load current I, weighting factors $a_1$, $b_1$ are added to the change from the concentration $D_0$ to the concentration $D_1$ of the mixture fuel consumed in the power generation unit 7 and to the change from the consumption speed $L_0$ to the consumption speed $L_1$ of the mixture fuel in the power generation unit 7, thereby deciding the concentration $D_1$ of the mixture fuel and the consumption speed $L_1$ of the mixture fuel.

The control unit 10 selects α, β corresponding to $D_1$ and $L_1$, and decides the values of the air supply amount $Qc^{Air}$, the fuel supply amount $Qa^{MeOH}$ and the load current I which will be the selected parameters α, β, and then outputs, on the basis of these values, the manipulation command signals S5, S4 and S8 to the air supply unit 6, the fuel circulation unit 5 and the power adjustment unit 8. When the volume C and the concentration V of the mixture fuel are within the predetermined ranges after the predetermined time ΔT has passed from the output of the manipulation command signals, the control unit 10 outputs the manipulation signals S5, S4 and S8 to the air supply unit 6, the fuel circulation unit 5 and the power adjustment unit 8 to return the values of the air supply amount $Qc^{Air}$ and the fuel supply amount $Qa^{MeOH}$ to the values during rated operation (K214→K215→ K216→K202→ K204→ K205→ K203).

Furthermore, when the concentration C and the volume V of the mixture fuel do not fall within the predetermined ranges even after the predetermined time ΔT has passed, the control loop is repeated until they fall within the predetermined ranges. However, when the concentration C and the volume V of the mixture fuel do not fall within the predetermined ranges even if the loop is repeated N times, the loop is terminated (K212→K213→K214→K215→K216→K202→K208→ K209→K212→K213→K214→K217).

In addition, when it has been judged that the concentration of the mixture fuel is normal and the volume of the mixture fuel can be controlled with the air supply amount $Qc^{Air}$ and the fuel supply amount $Qa^{MeOH}$, the control unit 10 manipulates the fuel circulation unit 5 and the air supply unit 6, and thus performs the control loop operation shown in FIG. 12 to control the concentration C and the volume V (K203). When it has been judged that the concentration of the mixture fuel is normal and that the volume of the mixture fuel can not be controlled with the air supply amount $Qc^{Air}$ and the fuel supply amount $Qa^{MeOH}$ but can be controlled with the air supply amount $Qc^{Air}$, the fuel supply amount $Qa^{MeOH}$ and the load current I, the control unit 10 again manipulates the fuel circulation unit 5, the air supply unit 6 and the power adjustment unit 8 to control the volume V and the concentration C.

According to the present embodiment, not only $Qc^{Air}$ and $Qa^{MeOH}$ but also the load current I is added to control targets, control domains of the concentration and volume are further expanded.

Third Embodiment

Next, a third embodiment of the present invention will be described.

In the third embodiment, a fuel circulation unit 5 or an air supply unit 6 is controlled to adjust a concentration C and volume V of a mixture fuel, and moreover, a highly concentrated fuel supply unit 3 is controlled to change a fuel supply amount $Qconc^{MeOH}$.

In the process of adjusting the concentration of the mixture fuel, when the concentration of the mixture fuel is lower than a predetermined concentration (e.g., 1.5M), the fuel circulation unit 5 is controlled to adjust a fuel supply amount $Qa^{MeOH}$, and methanol sufficient for power generation is not supplied to a catalyst layer on an anode side of a power generation unit 7, so that a power generation voltage of the power generation unit 7 tends to decrease. On the other hand, when the concentration of the mixture fuel is higher than a predetermined concentration (e.g., 2.5M), excessive methanol for the power generation is supplied to the catalyst layer on the anode side of the power generation unit 7, so that β increases and the power generation voltage of the power generation unit 7 tends to decrease. Moreover, if the concentration of the mixture fuel becomes still higher, the life of the power generation unit 7 may be significantly shortened. The value of the concentration changes depending on the kind of catalyst used in the power generation unit 7 and the configuration of electrodes. Therefore, while the fuel circulation unit 5 and the air supply unit 6 are controlled, the fuel supply amount $Qconc^{MeOH}$ is controlled by the fuel supply unit 3.

It is to be noted that conditions for controlling the fuel supply amount $Qconc^{MeOH}$ are (a) and (b) below.

(a) A case where the concentration of the mixture fuel is blow the predetermined concentration, and the volume of the mixture fuel in a mixing tank is at a degree that can increase the supply amount of a raw fuel or a highly concentrated fuel.

(b) A case where the concentration of the mixture fuel is above the predetermined concentration, and the volume of the mixture fuel in the mixing tank is at a degree that can stop the supply or decrease the supply amount of the raw fuel or the highly concentrated fuel.

Figure 15:
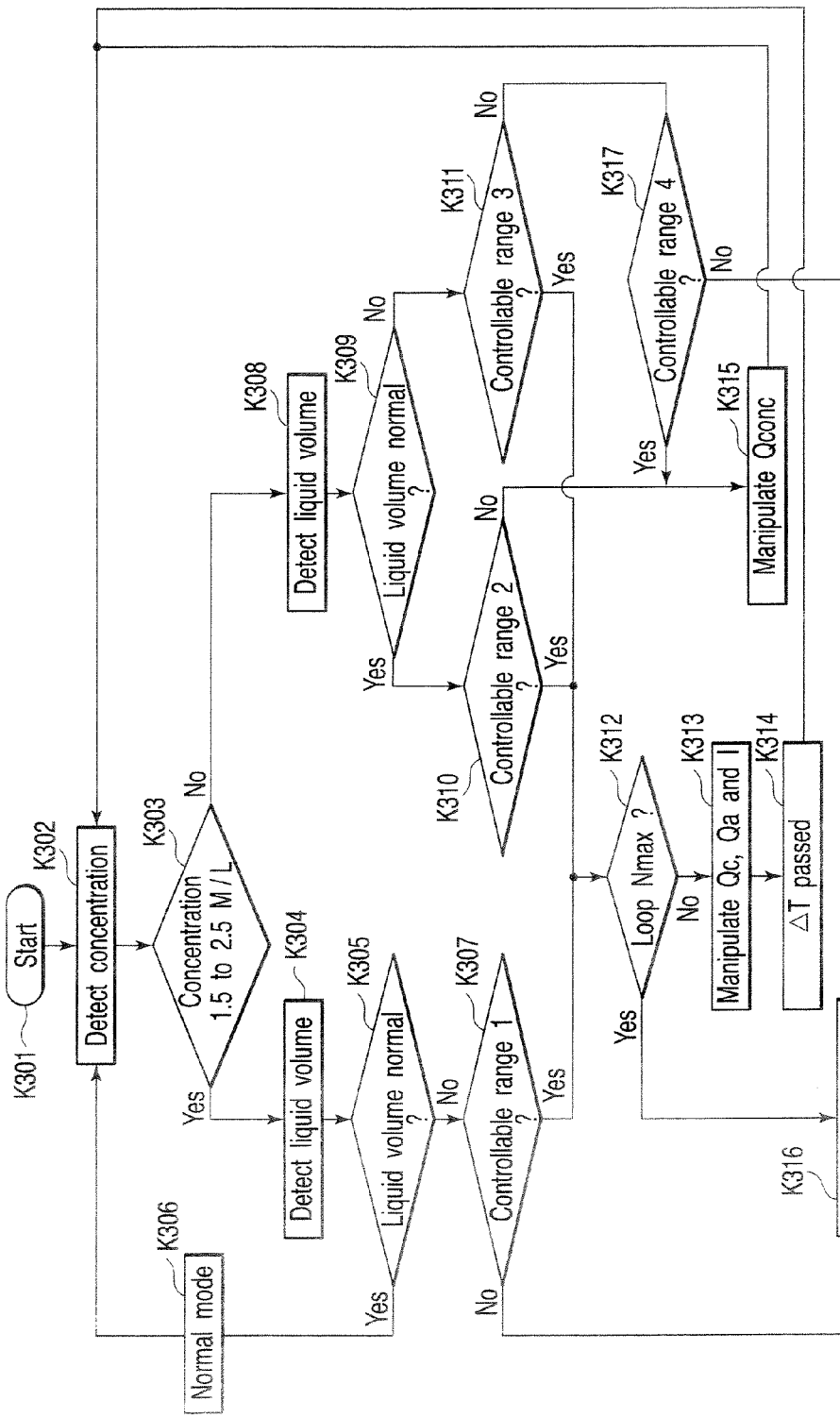
FIG. 15 is a flowchart when the concentration and volume of a fuel are controlled in another embodiment.

A control flowchart of the present embodiment is shown in FIG. 15. Initially, a concentration sensor 42 is used to detect the concentration of the mixture fuel, and a processing unit 20 judges whether or not the concentration of the mixture fuel is within a predetermined range. In the present embodiment, the predetermined range is 1.5M to 2.5M which is a region where the output of the power generation unit 7 can keep a certain level or more. Here, when the concentration of the mixture fuel is within the predetermined range, a liquid volume sensor 43 is used to detect the volume of the mixture fuel, and the processing unit 20 thus judges whether or not the volume V of the mixture fuel is within the predetermined range. When the volume V is within the predetermined range, both the concentration and volume of the mixture fuel are within the predetermined ranges as in the first embodiment, so that the current air supply amount $Qc^{Air}$ and fuel supply amount $Qa^{MeOH}$ are maintained (K301→K302→ K303→ K304→ K305→K306).

In a case where the concentration of the mixture fuel is within the predetermined range, if it has been judged that the volume of the mixture fuel is not within the predetermined range as a result of detecting the volume of the mixture fuel, it is judged as in the first embodiment whether or not the volume of the mixture fuel is controllable (K301→ K302→K303→K304→K305→K307). When the volume is judged to be uncontrollable, processing is terminated (K307→K316).

When the volume is judged to be controllable, the control unit 10, as in the first embodiment described above, selects α, β, and decides the value of the air supply amount $Qc^{Air}$ and the value of the fuel supply amount $Qa^{MeOH}$ from the selected α, β, and then outputs, on the basis of these values, manipulation command signals S5 and S4 to the air supply unit 6 and the fuel circulation unit 5, respectively.

When the volume of the mixture fuel is within the predetermined range after a predetermined time ΔT has passed from the output of the manipulation command signals, the control unit 10 outputs the manipulation signals S4 and S5 to the fuel circulation unit 5 and the air supply unit 6, respectively, to return the air supply amount $Qc^{Air}$ and the fuel supply amount $Qa^{MeOH}$ to values during rated operation (K307→K312→K313→K314→K302→K303→K304→ K305→K306).

Furthermore, when the volume V of the mixture fuel does not fall within the predetermined range even after the predetermined time ΔT has passed, the control loop is repeated until the volume V falls within the predetermined range. When the volume of the mixture fuel does not fall within the predetermined range even if the loop is repeated N times, the loop is terminated (K307→K312→ K313→ K314→ K302→K303→K304→K305→K307→K312→K316).

When the concentration of the mixture fuel is not within the predetermined range, the control unit 10 detects the volume of the mixture fuel, and judges whether or not the volume of the mixture fuel is within the predetermined range. When the volume of the mixture fuel is within the predetermined range, the control unit 10 judges whether or not the concentration of the mixture fuel is controllable (K301→K302→ K303→ K308→K309→K310).

When the concentration is judged to be controllable, the control unit 10, as in the first embodiment, selects α, β, and decides the values of the air supply amount $Qc^{Air}$ and the fuel supply amount $Qa^{MeOH}$ from the selected α, β, and then outputs the manipulation command signals S5 and S4 to the air supply unit 6 and the fuel circulation unit 5, respectively. Then, when the concentration of the mixture fuel is within the predetermined range after the predetermined time ΔT has passed from the output of the manipulation command signals, the control unit 10 outputs the manipulation signals S4 and S5 to the fuel circulation unit 5 and the air supply unit 6, respectively, to return the air supply amount $Qc^{Air}$ and the fuel supply amount $Qa^{MeOH}$ to the values during rated operation (K310→K312→K313→K314→K302→K303→K304→K305→K306).

Furthermore, when the concentration C of the mixture fuel does not fall within the predetermined range even after the predetermined time ΔT has passed, the control loop is repeated until the concentration C falls within the predetermined range. When the concentration C of the mixture fuel is not within the predetermined range even if the loop is repeated N times, the loop is terminated (K310→K312→K313→K314→K302→K303→K308→K309→K310→K312→K316).

Moreover, when the concentration has been judged to be uncontrollable, the manipulation command signal is output to the fuel supply unit 3 (K315). Specifically, when the concentration C of the mixture fuel detected in step K302 is below the predetermined range, for example, below a lower limit value 1.0M, a manipulation command signal which increases the fuel supply amount $Qconc^{MeOH}$ is output to the fuel supply unit 3. Further, when the concentration C detected in step K302 is above the predetermined range, for example, above an upper limit value 3.0M, a manipulation command signal which decreases the fuel supply amount $Qconc^{MeOH}$ is output to the fuel supply unit 3. After the manipulation command signal is output to the fuel supply unit, the concentration C of the mixture fuel is again judged (K315→K302→K303).

When the processing unit 20 has judged that the concentration C of the mixture fuel is not within the predetermined range and that the volume V is not within the predetermined range either, it judges whether or not the concentration C and the volume V of the mixture fuel are controllable (K301→K302→K303→K308→K309→K311).

When they have been judged to be controllable, the control unit 10 adds weighting factors $a_1$, $b_1$ of a change from a concentration $D_0$ to a concentration $D_1$ of the mixture fuel consumed in the power generation unit 7 and of a change from a consumption speed $L_0$ to a consumption speed $L_1$ of the mixture fuel in the power generation unit 7, thereby deciding the concentration $D_1$ of the mixture fuel and the consumption speed $L_1$ of the mixture fuel. Further, the control unit 10 selects α, β corresponding to $D_1$ and $L_1$, and decides the values of the air supply amount $Qc^{Air}$ and the fuel supply amount $Qa^{MeOH}$ which will be the selected parameters α, β, and then outputs the manipulation command signals S5 and S4 to the air supply unit 6 and the fuel circulation unit 5. When the volume and the concentration of the mixture fuel are within the predetermined ranges after the predetermined time ΔT has passed from the output of the manipulation command signals, the control unit outputs the manipulation signals S5 and S4 to the fuel circulation unit 5 and the air supply unit 6, respectively, to return the air supply amount $Qc^{Air}$ and the fuel supply amount $Qa^{MeOH}$ to the values during rated operation (K311→K312→K313→K314→K302→K303→K304→K305→K306).

Furthermore, when the concentration and volume of the mixture fuel do not fall within the predetermined ranges even after the predetermined time ΔT has passed, the control loop is repeated until they fall within the predetermined range. When the concentration C and the volume V of the mixture fuel are not within the predetermined range even if the loop is repeated N times, the loop is terminated (K311→K312→K313→K314→K302→K303→K308→K309→K311→K312→K316).

Moreover, when they have been judged to be uncontrollable, the processing unit 20 controls the fuel supply amount $Qconc^{MeOH}$ to judge whether or not the volume V of the mixture fuel is controllable (K311→K317). Here, as to whether or not the volume of the mixture fuel is controllable, a predetermined upper limit value and lower limit value are preset, and the volume can be judged to be controllable when it is within a range below the upper limit value and above the lower limit value, while the volume can be judged to be uncontrollable when it is out of this range. The predetermined upper limit value and lower limit value are values different from the standard of judgment of controllability in step K307 and step K311, but are a predetermined range to judge whether or not the control of the fuel supply amount $Qconc^{MeOH}$ allows the control of the volume.

When it has been judged that the volume of the mixture fuel is controllable by controlling the fuel supply amount $Qconc^{MeOH}$, the manipulation command signal is output to the fuel supply unit 3 (K315). Specifically, when the concentration of the mixture fuel detected in step K302 is below the predetermined range, for example, below a lower limit value 1.0M, a manipulation command signal which increases the fuel supply amount $Qconc^{MeOH}$ is output to the fuel supply unit 3. Further, when the concentration of the mixture fuel detected in step K302 is above the predetermined range, for example, above an upper limit value 3.0M, a manipulation command signal which decreases the fuel supply amount $Qconc^{MeOH}$ is output to the fuel supply unit 3. After the manipulation command signal is output to the fuel supply unit, the concentration of the mixture fuel is again judged (K315→ K302→ K303).

When it has been judged that the concentration of the mixture fuel is uncontrollable by controlling the fuel supply amount $Qconc^{MeOH}$, processing is terminated (K317→K316).

According to the present embodiment, not only $Qc^{Air}$ and $Qa^{MeOH}$ but also $Qconc^{MeOH}$ is added to control targets, controllable domains of the concentration and volume are further expanded.

Fourth Embodiment

In the present embodiment, there will be described a passive fuel cell system 1A mainly using natural force (e.g., capillary force) to carry a fluid. The passive fuel cell system 1A of the present embodiment is different from the fuel cell system 1 shown in the first to third embodiments in that it does not necessarily require a fuel supply unit 3 and an air supply unit 6 whose manipulated variables are controllable.

As shown in FIG. 16, the fuel cell system 1A comprises a power generation unit 7, a highly concentrated fuel tank 2, a mixing tank 4, a power adjustment unit 8, a gas-liquid separation unit 41, at least one of an air-cooling fan 71 and a heater 73, a temperature sensor 72 and a control unit 10A.

The overall fuel cell system 1A is totally controlled by the control unit 10A. The control unit 10A is connected to the power generation unit 7 and auxiliary equipment by signal lines, and various signals are transmitted/received among the control unit 10A, the power generation unit 7 and the auxiliary equipment. For example, a concentration sensor 42 detects the concentration of a mixture fuel (e.g., a methanol solution) in the mixing tank 4, and sends a concentration detection signal S1 to the control unit 10A. The temperature sensor 72 detects the temperature of the power generation unit 7, and sends a temperature detection signal S3 to the control unit 10A.

Figure 17:
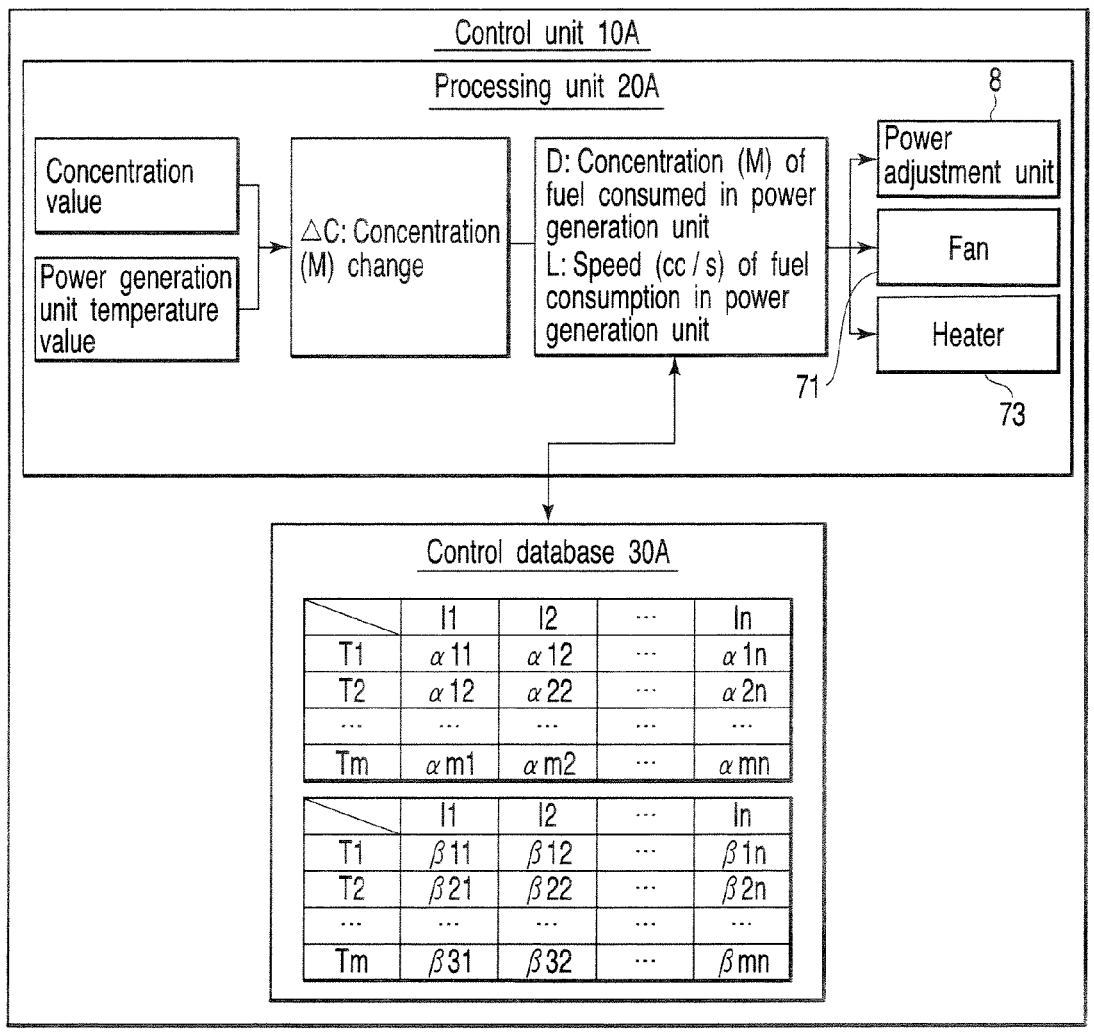
FIG. 17 is a control block diagram of the fuel cell system shown in FIG. 16.

As shown in FIG. 17, the control unit 10A obtains various controlled variables on the basis of the detection signals S1 and S3 and of process data in a control database 30A, and obtains various manipulated variables on the basis of the obtained controlled variables and various parameter values of a processing unit 20, thus outputting manipulation command signals S7, S8 and S9 to any one or two or more of the fan 71 the power adjustment unit 8 and the heater 73. For example, if the manipulation signal S8 is output from the control unit 10A to the power adjustment unit 8, a load current I applied to a load 9 is adjusted to a desired value. It is to be noted that the control database 30A stores, as the process data, a table which relates cell temperature T, and the load current I with α, β, as shown in FIG. 17.

The power generation unit 7 is provided adjacently to the mixing tank 4, and an anode of an MEA thereof is provided so that the mixture fuel in the mixing tank 4 can contact the anode. Moreover, a cathode thereof is provided at a place which allows air outside the fuel cell system 1A to be supplied thereto and allows by-product water to be discharged to the outside of the system.

Furthermore, the power generation unit 7 has at least one of the fan 71 and the heater 73, and the temperature sensor 72. The fan 71 and the heater 73 are used as temperature adjustment means of the power generation unit 7. The fan 71 blows cool air to the power generation unit 7, and cools down the power generation unit 7. The heater 73 resists and generates heat by power supply from an unshown power source, and heats the power generation unit 7. The temperature sensor 72 detects the temperature of the power generation unit 7, and sends the temperature detection signal S3 to the control unit 10A. Moreover, the fan 71 supplies air to the cathode of the MEA, and used as means for discharging the by-product.

A liquid is used for the mixture fuel supplied to the anode. Hereinafter, the methanol solution is assumed as one example of the mixture fuel. The highly concentrated fuel tank 2 stores a raw fuel (e.g., a methanol solution having a purity of 99.9% or more) or a highly concentrated fuel including a small amount of water (e.g., a mixed solution of methanol and water having a concentration of 10M or more). The highly concentrated fuel tank 2 can be supplied with the fuel from an unshown supply port.

The mixing tank 4 communicates with the highly concentrated fuel tank 2 via a line L1. In the mixing tank 4, the raw fuel or the highly concentrated fuel from the highly concentrated fuel tank 2 is mixed with a mixed solution returned from the anode of the power generation unit 7. The mixing tank 4 has a mechanism which fills the inside of the mixing tank 4 with the mixture fuel. Thus, if the highly concentrated fuel tank 2 is installed on the top of the mixing tank 4 to provide a structure in which the raw fuel or the highly concentrated fuel is supplied from the highly concentrated fuel tank 2 by gravitation when the liquid volume in the mixing tank 4 has decreased. It is to be noted that the mixing tank 4 contains a diluted methanol solution having an initial concentration ranging from 1.5M to 2.5M (mol/litter), and the mixture fuel is supplied from the mixing tank 4 to the power generation unit 7 by a water head difference or gas pressure from the highly concentrated fuel tank 2.

A gas-liquid separation unit 41 is attached to the power generation unit 7. The gas-liquid separation unit 41 has a gas-liquid separation film to separate carbon dioxide gas from the mixed solution. The gas-liquid separation unit 41 is provided on the top of the power generation unit 7, and discharges carbon dioxide through the gas-liquid separation unit 41 by use of gravitation.

The mixing tank 4 comprises the concentration sensor 42 as means for detecting the concentration of the mixture fuel. The concentration sensor 42 is installed at a proper place inside the mixing tank 4. However, the concentration sensor 42 is an optional component in the system of the present invention. This is because the concentration of the fuel can also be detected by software instead of the concentration sensor (hardware). That is, the control unit 10A can possess a computer program which estimates the concentration of the fuel from the output and the information on the temperature of the power generation unit 7. It is to be noted that, for example, a supersonic type or near-infrared multiple wavelength light type concentration sensor can be used for the concentration sensor 42.

The power adjustment unit 8 is provided between the power generation unit 7 and the load 9 to smoothly take an output from the power generation unit 7 out to the load 9. A circuit in the power adjustment unit 8 is connected to an output side of the control unit 10, so that the load current I applied to the load 9 is controlled. It is to be noted that power generated in the power generation unit 7 is output to the power adjustment unit 8 via a lead wire 81.

Since the fuel cell system 1A of the present embodiment has a structure which does not necessarily require a fuel circulation unit 5 and an air supply unit 6, the fuel cell system 1A can be simplified, but it is not necessarily possible to manipulate the fuel circulation unit 5 and the air supply unit 6 to change α, β and control the concentration of the mixture fuel, as it is possible in the fuel cell system 1 shown in the first embodiment. Moreover, since this structure does not necessarily require the fuel supply unit 3 either, it is not necessarily possible to manipulate the fuel supply unit 3 to control the concentration of the mixture fuel.

In such a case, a temperature T of the power generation unit 7 and the power adjustment unit 8 are used as the manipulated variables to control the concentration of the mixture fuel supplied to anode. In order to manipulate the temperature T of the power generation unit 7, the rotation number of the fan 71 is adjusted to control the degree of cooling the power generation unit 7, or energy supplied to the heater 73 is adjusted to control the degree of heating the power generation unit 7, while monitoring the temperature of the power generation unit 7 by the temperature sensor 72 (e.g., a thermocouple).

The concentration sensor 42 detects the concentration of the mixture fuel from the results in FIGS. 10 and 11, and when the control unit 10A has judged that the detected concentration of the mixture fuel is high, the power adjustment unit 8 is manipulated to increase the load current I taken out of the power generation unit 7. At this point, an operation to increase the rotation number of the fan 71 or an operation to reduce the energy supplied to the heater 73 is performed. In the regard, it is preferable to drop the temperature T of the power generation unit 7 to restrain a decrease in the amount of the mixture fuel in the mixing tank 4. If the load current I is increased to decrease the volume of the mixture fuel in the mixing tank 4, the raw fuel or the highly concentrated fuel corresponding to the decrease flows from the highly concentrated fuel tank 2 into the mixing tank 4, so that the consumption amount of the raw fuel or the highly concentrated fuel can be restrained by dropping the temperature T.

On the contrary, when the control unit 10A has judged that the detected concentration of the mixture fuel is low, the power adjustment unit 8 is manipulated to decrease the load current I taken out of the power generation unit 7. At this point, an operation to decrease the rotation number of the fan 71 or an operation to increase the energy supplied to the heater 73 is performed. In the regard, it is preferable to raise the temperature T of the power generation unit 7 to restrain an increase in the amount of the mixture fuel in the mixing tank 4. If the load current I is decreased to increase the concentration of the mixture fuel in the mixing tank 4, the flow of the raw fuel or the highly concentrated fuel from the highly concentrated fuel tank 2 into the mixing tank 4 is reduced in response to the above increase, then, that a decrease in the concentration of the mixture fuel in the mixing tank 4 can be restrained by raising the temperature T.

Consequently, when the control unit has judged that one or both of the concentration and volume of the mixture fuel is/are abnormal in accordance with the state thereof, the power generation unit temperature T or the load current I or both of them is/are manipulated on the basis of the correlation of the power generation unit temperature T, the load current I and α, β, thereby allowing the control of the concentration of the mixture fuel.

In addition to the embodiments described above, five manipulated variables of the fuel circulation unit, the fuel supply unit, the air supply unit, the power adjustment unit (load current) and the temperature adjustment means (power generation unit temperature) can be variously combined to control the concentration and volume of the mixture fuel.

According to the embodiments of the present invention, it is not necessary to separately provide a water tank and a water collection path to adjust the concentration and volume of the mixture fuel, leading to a simpler structure which reduces the size of an apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A method of controlling a fuel cell system which comprises a power generation unit including an anode, a cathode, and an electrolytic film provided between the anode and the cathode, a fuel tank which stores a raw fuel or a highly concentrated fuel, a collection path coupled to the power generation unit, which collects an emission supplied from the anode, a mixing tank communicated with the power generation unit via the anode collection path and communicated with the fuel tank, which mixes the emission with the raw fuel or the highly concentrated fuel to produce a mixture fuel, a fuel circulation unit provided between the mixing tank and the power generation unit, which supplies the mixture fuel from the mixing tank to the anode of the power generation unit so that the mixture fuel is circulated between the mixing tank and the power generation unit, a fuel supply unit which supplies the raw fuel or the highly concentrated fuel from the fuel tank to the mixing tank, an air supply unit which supplies air to the cathode of the power generation unit, a power adjustment unit which adjusts a current applied to a load of the fuel cell system, and temperature adjustment means for adjusting a temperature of the power generation unit, the method comprising:

detecting a concentration and a volume of the mixture fuel in the fuel tank to be supplied to the anode of the power generation unit during power generation to generate a detection signal; and controlling at least one of the fuel circulation unit, the fuel supply unit, and the air supply unit based on the detection signal to control at least one of the concentration and the volume of the mixture fuel, wherein the controlling includes increasing an amount of the mixture fuel supplied by the fuel circulation unit when the detection signal indicates that the concentration or the volume of the mixture fuel in the mixing tank is increased above a predetermined level, and decreasing the amount of the mixture fuel supplied by the fuel circulation unit when the detection signal indicates that the concentration or the volume of the mixture fuel in the mixing tank is decreased below the predetermined level.

2. The method according to claim 1, wherein
when the control unit determines that at least one of the concentration and the volume of the mixture fuel is controllable under manipulation of the both of the air supply unit and the fuel circulation unit, the controlling includes manipulating both of the air supply unit and the fuel circulation unit.

3. The method according to claim 1, wherein
when the control unit determines that at least one of the concentration and the volume of the mixture fuel is uncontrollable by use of the air supply unit and the fuel circulation unit, the controlling includes manipulating the power adjustment unit in addition to manipulating the air supply unit and the fuel circulation unit.

4. The method according to claim 1, wherein
when the control unit determines that at least one of the concentration and the volume of the mixture fuel is uncontrollable by use of the air supply unit and the fuel circulation unit, the controlling includes manipulating the fuel supply unit in addition to manipulating the air supply unit and the fuel circulation unit.

5. The method according to claim 1, wherein said fuel cell system further comprises temperature detection means which is provided to detect the temperature of the power generation unit to generate a temperature detection signal,
wherein the controlling includes manipulating at least one of the fuel circulation unit, the fuel supply unit, the power adjustment unit, and the temperature adjustment means based on the temperature detection signal to control at least one of the concentration and the volume of the mixture fuel supplied to the anode.

6. The method according to claim 1, further comprising detecting the volume and the concentration of the mixture fuel in the mixing tank, wherein the controlling includes controlling the power adjustment unit to decrease the load current, if the mixture fuel in the mixing tank is decreased under a predetermined volume and a predetermined concentration.

7. The method according to claim 1, further comprising detecting the volume and the concentration of the mixture fuel in the mixing tank, wherein the controlling includes controlling the power adjustment unit to increase the load current, if the mixture fuel in the mixing tank is increased over a predetermined volume and a predetermined concentration.

8. The method according to claim 1, wherein the controlling includes increasing an amount of the raw fuel or the highly concentrated fuel supplied by the fuel supply unit when the detection signal indicates that the concentration or the volume of the mixture fuel in the mixing tank is decreased, and decreasing the amount of the raw fuel or the highly concentrated fuel supplied by the fuel supply unit when the detection signal indicates that the concentration or the volume of the mixture fuel in the mixing tank is increased.

9. The method according to claim 1, wherein the controlling includes increasing an amount of the air supplied by the air supply unit when the detection signal indicates that the volume of the mixture fuel in the mixing tank is increased above the predetermined level and the concentration of the mixture fuel is constant, and decreasing the amount of the air supplied by the air supply unit when the detection signal indicates that the volume of the mixture fuel in the mixing tank is decreased below the predetermined level and the concentration of the mixture fuel is constant.

* * * * *